United States Patent
Takasaki et al.

(10) Patent No.: US 8,717,444 B2
(45) Date of Patent: May 6, 2014

(54) INFORMATION PROCESSOR AND CONTROL METHOD THEREFOR

(75) Inventors: Atsushi Takasaki, Kanagawa (JP); Toshihiko Myojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1615 days.

(21) Appl. No.: 10/992,375

(22) Filed: Nov. 18, 2004

(65) Prior Publication Data

US 2005/0111036 A1 May 26, 2005

(30) Foreign Application Priority Data

Nov. 20, 2003 (JP) ................................. 2003-390404
Dec. 15, 2003 (JP) ................................. 2003-416998

(51) Int. Cl.
*H04N 5/225* (2006.01)
*H04N 5/232* (2006.01)

(52) U.S. Cl.
USPC ..................................... 348/207.1; 348/211.3

(58) Field of Classification Search
USPC ................. 348/211.99–211.14; 455/418–420
See application file for complete search history.

(56) References Cited

U.S. PATENT DOCUMENTS

| | | | | |
|---|---|---|---|---|
| 6,128,661 | A * | 10/2000 | Flanagin et al. | 709/227 |
| 6,359,837 | B1 * | 3/2002 | Tsukamoto | 368/10 |
| 6,750,902 | B1 * | 6/2004 | Steinberg et al. | 348/211.3 |
| 7,133,893 | B2 * | 11/2006 | Goldstein | 709/203 |
| 7,148,918 | B1 * | 12/2006 | Yoda | 348/211.3 |
| 7,339,610 | B2 * | 3/2008 | Kusaka | 348/207.1 |
| 7,375,742 | B2 * | 5/2008 | Aizawa | 348/207.1 |
| 7,421,246 | B2 * | 9/2008 | Layley et al. | 455/41.2 |
| 7,602,421 | B2 * | 10/2009 | Hunter et al. | 348/211.3 |
| 7,619,657 | B2 * | 11/2009 | Watanabe et al. | 348/211.2 |
| 2001/0012060 | A1 | 8/2001 | Wakui | |
| 2001/0024236 | A1 * | 9/2001 | Sato et al. | 348/239 |
| 2002/0037711 | A1 | 3/2002 | Mizutani | |
| 2002/0037745 | A1 | 3/2002 | Yahiro | |
| 2002/0063781 | A1 * | 5/2002 | Aizawa | 348/211 |

(Continued)

FOREIGN PATENT DOCUMENTS

| | | |
|---|---|---|
| EP | 0 984 600 | 3/2000 |
| JP | 2001-111977 A | 4/2001 |

(Continued)

OTHER PUBLICATIONS

English translation by human translator of JP 2003-316892 submitted with Information Disclosure statement filed Apr. 1, 2009.

(Continued)

*Primary Examiner* — Timothy J Henn
*Assistant Examiner* — Pritham Prabhakher
(74) *Attorney, Agent, or Firm* — Cowan, Liebowitz & Latman, P.C.

(57) ABSTRACT

A remote control device searches for an image data storing device and a printing device that can be used by a user, and notifies an image taking device of device information obtained as a result of this search. The image taking device searches for a device having a predetermined function in response to an instruction from the remote control device, and if a device included in the device information notified by the remote control device is found, transfers an image to the found device. Alternatively, the image taking device connects to a device notified by the remote control device, and sends the image to the notified device to perform printing or storing thereon.

12 Claims, 19 Drawing Sheets

(56) References Cited

U.S. PATENT DOCUMENTS

| | | | |
|---|---|---|---|
| 2002/0093575 A1* | 7/2002 | Kusaka | 348/233 |
| 2002/0191081 A1* | 12/2002 | Ueyama | 348/207.1 |
| 2003/0028672 A1 | 2/2003 | Goldstein | |
| 2003/0103144 A1* | 6/2003 | Sesek et al. | 348/207.1 |
| 2004/0117788 A1* | 6/2004 | Karaoguz et al. | 717/177 |

FOREIGN PATENT DOCUMENTS

| | | |
|---|---|---|
| JP | 2001-128113 A | 5/2001 |
| JP | 2001-275030 | 10/2001 |
| JP | 2002-057836 | 2/2002 |
| JP | 2002-99475 | 4/2002 |
| JP | 2002-101226 A | 4/2002 |
| JP | 2002-199121 A | 7/2002 |
| JP | 2003-258810 | 9/2003 |
| JP | 2003-316892 | 11/2003 |

OTHER PUBLICATIONS

Communication dated Jun. 26, 2006 with European Search Report in connection with EP Application No. 04257094.5-2202.

The above references were cited in a Dec. 8, 2009 Japanese Office Action, of which is not enclosed, that issued in Japanese Patent Application No. 2003-416998.

* cited by examiner

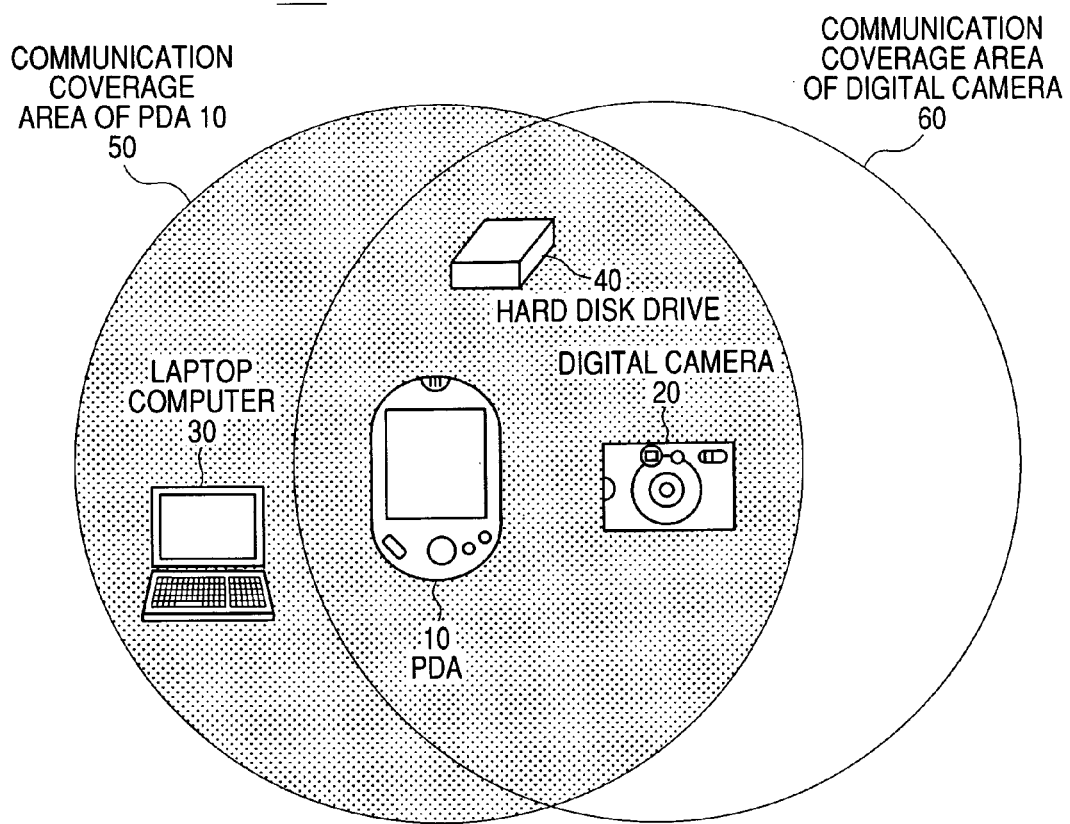

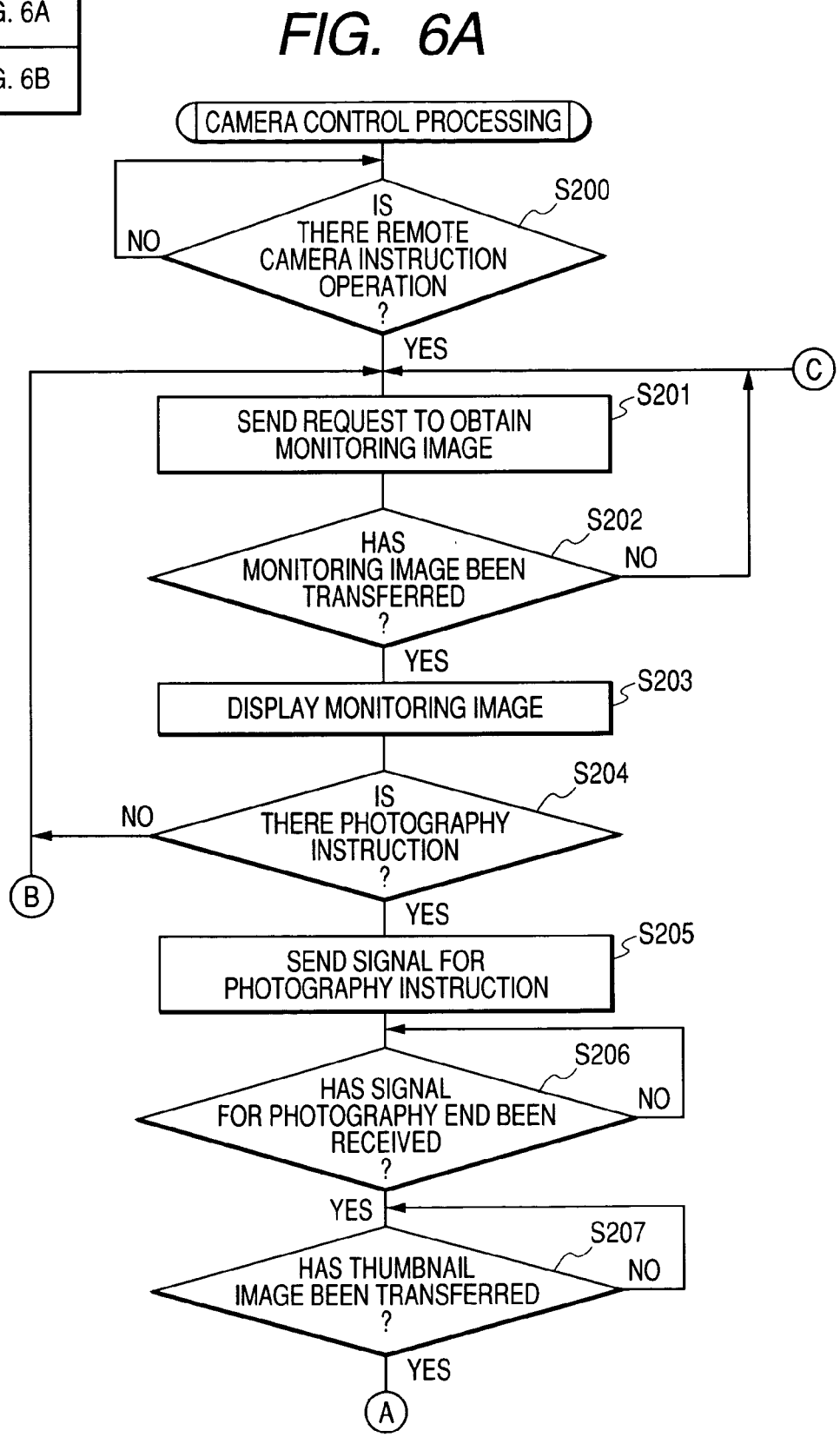

INFORMATION PROCESSOR AND CONTROL METHOD THEREFOR

BACKGROUND OF THE INVENTION

1. Field of the Invention

The present invention relates to an information processor for remotely operating another information processor, an information processor that is remotely operated by a remote control device, and a control method therefor.

2. Related Background Art

In recent years, networks have come into widespread use in the information technology field, making it possible to connect various devices via a network and share data to be used by the devices over the network. Examples of the network include a wide area network represented by the Internet and a local area network used in a limited area. In addition, a personal network by which a network can easily be built for personal use, and other networks are well on the way to widespread use.

Examples of means adopted for building a network include not only a conventional wired communication system, but also a wireless LAN standardized by IEEE 802.11 and a short-range wireless communication system represented by a Bluetooth wireless technology.

In one of applications making use of those network technologies, an image taking device represented by a digital still camera or a digital video camera (hereinafter, referred to as "digital camera") is remotely controlled by a device such as a personal computer, a personal digital assistance (PDA), a cellular telephone, or a high-performance remote controller (hereinafter, referred to as "control device").

According to a conventional digital camera, a photography operation is inhibited when a free area for recording an image is available in none of various storage media such as a magnetic disk, an optical disk, a magnetic tape, and a semiconductor memory (hereinafter, generically referred to as "memory") for storing photographic image data. In other words, in the case where the digital camera that is being remotely controlled has the memory run out of free capacity during photography, a remote camera operation becomes disabled.

Accordingly, when there is no free capacity left in the memory during photography, a user who is operating a control device need to interrupt the remote camera control to operate the digital camera directly, and perform an operation such as transfer of image data to another device or replacement the memory itself. Therefore, there arises a problem in that the user is forced to move to a distant place where the digital camera is set and to perform troublesome operations.

That is, there is a problem in that when the digital camera that is being remotely controlled has the memory run out of free capacity during photography, the troublesome operations are necessary for continuing the photography.

Further, wireless technologies have been standardized as a result of many information devices having various wireless functions appearing on the market. Depending on how the standardized wireless technologies are put into actual operation, the situations may not always produce efficiency. For example, inefficient situations may occur in the case of implementing complicated connection services such as the case where a single device establishes a plurality of wireless communications with different devices independently or changes connection destinations sequentially among devices using various connection services in order to send an image from the image taking device, which is being remotely controlled by wireless communications, to a printer, a storage device, and the like for printing or storing the image.

Further, due to functional constraints inherently imposed on a device, there exists a device having an interface that does not necessarily suit the operation of wireless function portions or a device with limitations on the control operation itself. Accordingly, it may be difficult to operate those devices.

SUMMARY OF THE INVENTION

The present invention has been made in view of the above-mentioned problems, and therefore has an object to remotely control an information processor such as an image taking device to allow data stored in the information processor to be transferred to an optimum device provided separately.

Further, it is another object of the present invention to make it possible to continue photography easily and promptly in the case where there is no free capacity left in the memory of an image taking device during photography or other cases.

Further, it is another object of the present invention to make it possible to realize a wireless connection service that is constantly optimum without performing troublesome operations even if the form of the wireless connection service becomes complicated.

Further, other objects of the present invention will become apparent by reading the following specification and referring to the accompanying drawings.

BRIEF DESCRIPTION OF THE DRAWINGS

FIG. 1 is a drawing showing an image communication system according to a first embodiment of the present invention;

FIG. 2 is a diagram showing an example of a list file that is registered in a PDA serving as a control device and indicates information on a device that can store data, according to the first embodiment of the present invention;

DESCRIPTION OF THE PREFERRED EMBODIMENTS

Figure 3:
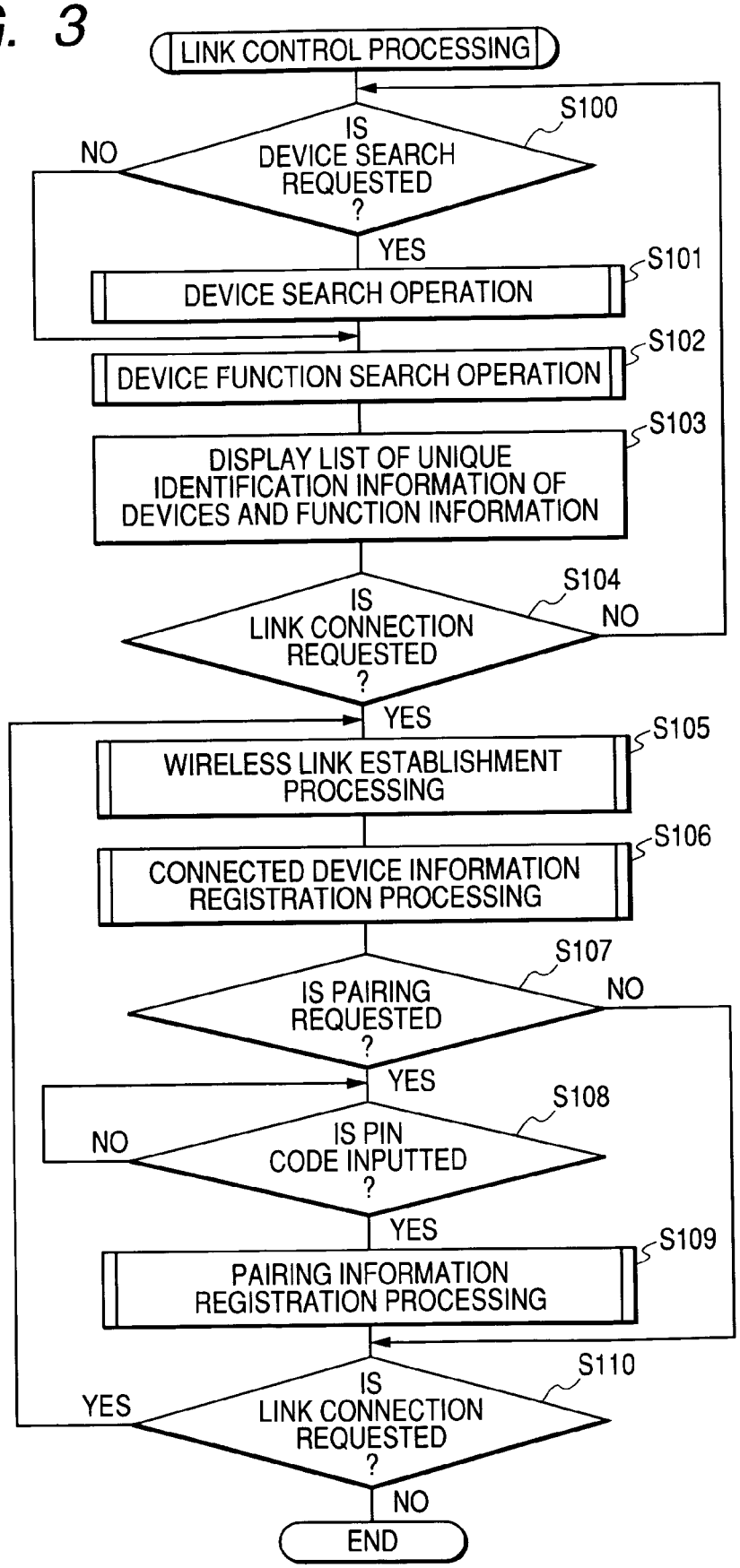
FIG. 3 is a flowchart showing a link control processing executed by the PDA serving as a control device according to the first embodiment of the present invention.

Best modes for carrying out the invention will be described according to the following embodiments.

First Embodiment

FIG. 1 is a drawing showing an image communication system CS1 according to a first embodiment of the present invention.

The image communication system CS1 includes a PDA 10, a digital camera 20, a laptop computer 30, and a hard disk drive 40. The PDA 10, the digital camera 20, the laptop computer 30, and the hard disk drive 40, each including a Bluetooth communication function, can communicate with one another.

The PDA 10 is a control device for controlling the digital camera 20 by wireless communications. Further, the laptop computer 30 has a storage function such as a hard disk. The hard disk drive 40 is an example of a storage device for image data.

A communication coverage area 50 is an area where the PDA 10 serving as a control device can communicate, and a communication coverage area 60 is an area where the digital camera 20 can communicate.

Figure 12:
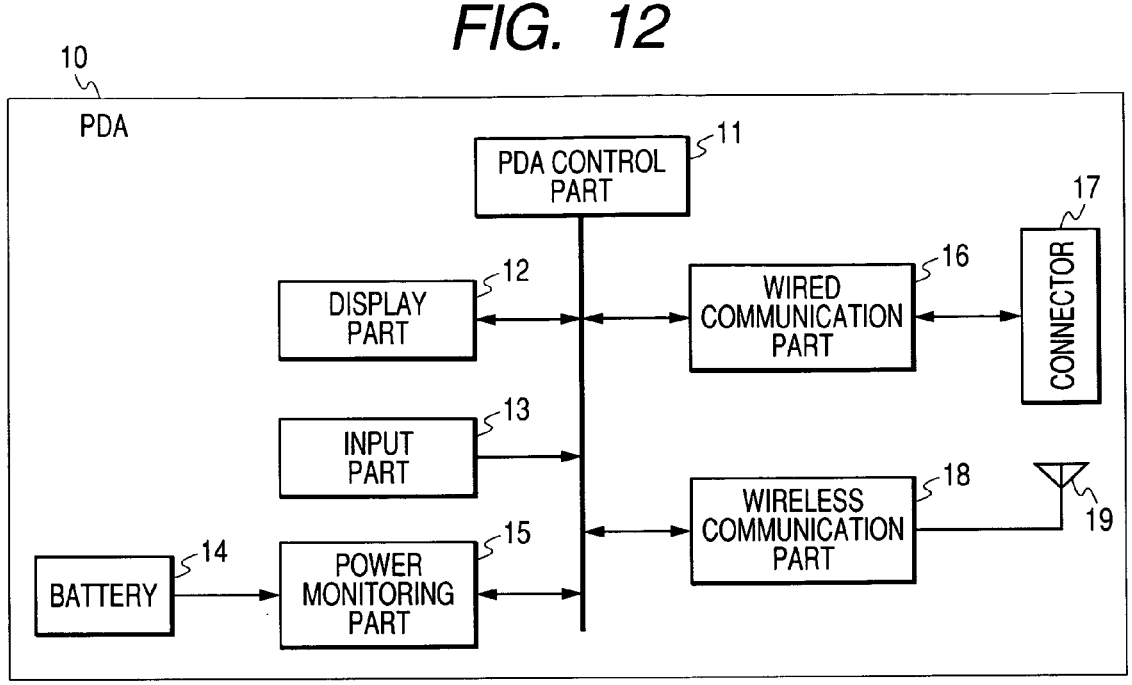
FIG. 12 is a diagram showing an internal configuration of the PDA included in the image communication system according to the first embodiment of the present invention.

FIG. 12 is a block diagram showing a specific example of the PDA 10.

The PDA 10 includes a PDA control part 11, a display part 12, an input part 13, a battery 14, a power monitoring part 15, a wired communication part 16, a connector 17, a wireless communication part 18, and an antenna 19.

The PDA control part 11 administrates overall control of the PDA 10, and physically includes a CPU, a ROM storing a control program, and a RAM. In response to a command from the input part 13, the PDA control part 11 plots an image on the display part 12, outputs the inputted command through a wire or wirelessly, and performs power monitoring and the like.

The display part 12 includes a TFT display and a controller therefor, and displays a command for camera control or the like and received image data.

The input part 13 includes a touch panel and a button, and performs operations of a power supply, the PDA 10, the digital camera 20, and the like.

The battery 14 supplies overall power to the PDA 10. The battery 14 may be adapted to supply power to an outside via the connector 17, or receive the supply of power from the outside. The power monitoring part 15 measures a battery capacity, and notifies the PDA control part 11 of measuring results.

The wired communication part 16 serves as a controller for the connector 17, monitors a connection state of the connector 17, and notifies the PDA control part 11 of monitoring results.

The connector 17 includes a plurality of connection terminals and power supply lines. The connector 17 sends/receives a control signal and data to/from another terminal.

The wireless communication part 18 has a function relating to Bluetooth wireless communications. The wireless communication part 18 receives a signal from the PDA control part 11, modulates the signal into an RF signal, and sends the RF signal to the antenna 19. The wireless communication part 18 demodulates an RF signal received from the antenna 19, and passes the resultant to the PDA control part 11.

The antenna 19 is used for sending/receiving an RF signal.

Figure 13:
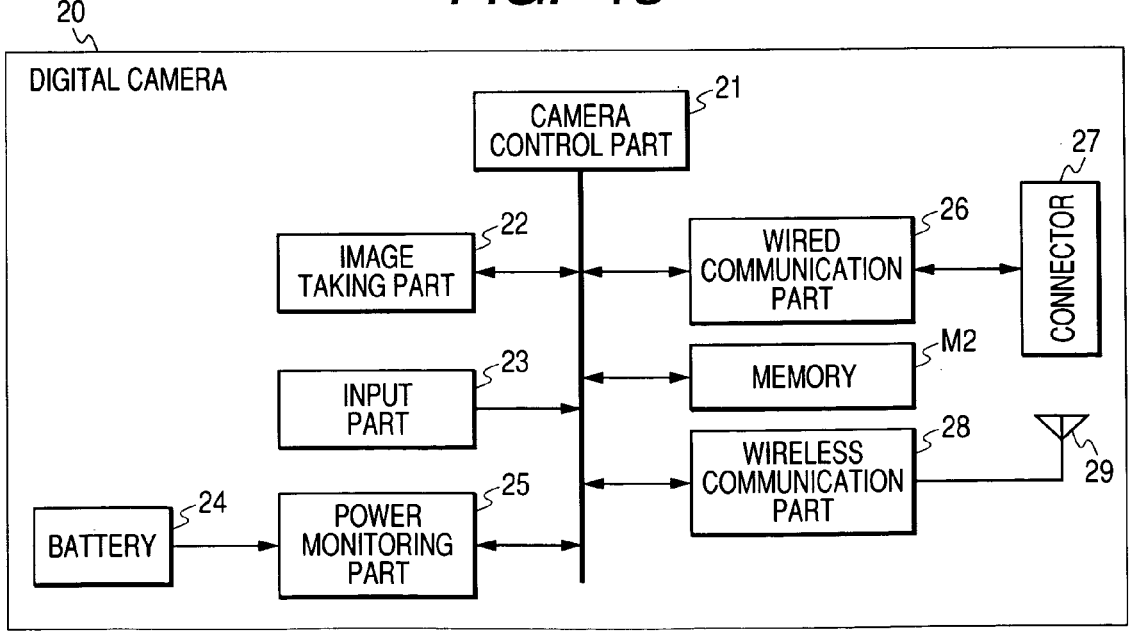
FIG. 13 a diagram showing an internal configuration of the digital camera included in the image communication system according to the first embodiment of the present invention.

FIG. 13 is a diagram showing an internal configuration of the digital camera 20.

The digital camera 20 includes a camera control part 21, an image taking part 22, an input part 23, a battery 24, a power monitoring part 25, a wired communication part 26, a connector 27, a wireless communication part 28, an antenna 29, and a memory M2.

The camera control part 21 has a function of administrating overall control of the digital camera 20, and physically includes a CPU, a ROM storing a control program, and a RAM. Objects to be controlled include photography for creating an image by the image taking part 22 in response to a trigger such as a shutter from the input part 23, outputting of photographic image data through a wire or wirelessly, and power monitoring.

The image taking part 22 includes an image pickup element (CCD) and an image buffer memory. A photographic image taken by the image taking part 22 is stored in the memory M2, and then outputted to the outside of the digital camera 20 via the wired communication part 26 or the wireless communication part 28 under the control of the camera control part 21.

The input part 23 includes simple buttons for operating a power supply, a shutter, camera zooming, and the like. The battery 24 supplies overall power to the digital camera 20. The battery 24 may be adapted to supply power to the outside via the connector 27, or receive the supply of power from the outside.

The power monitoring part 25 measures a battery capacity, and notifies the camera control part 21 of measuring results.

The wired communication part 26 serves as a controller for the connector 27, monitors a connection state of the connector 27, and notifies the camera control part 21 of monitoring results. The connector 27 includes a plurality of connection terminals and power supply lines. The connector 27 sends/receives a control signal and image data to/from another terminal.

The wireless communication part 28 has a function relating to Bluetooth wireless communications. The wireless communication part 28 receives a signal from the camera control part 21, modulates the signal into an RF signal, and sends the RF signal to the antenna 29. The wireless communication part 28 demodulates an RF signal received from the antenna 29, and passes the resultant to the camera control part 21.

The antenna 29 is used for sending/receiving an RF signal. The memory M2 is a removable card type memory, and stores the photographic image taken by the image taking part 22.

Figure 14:
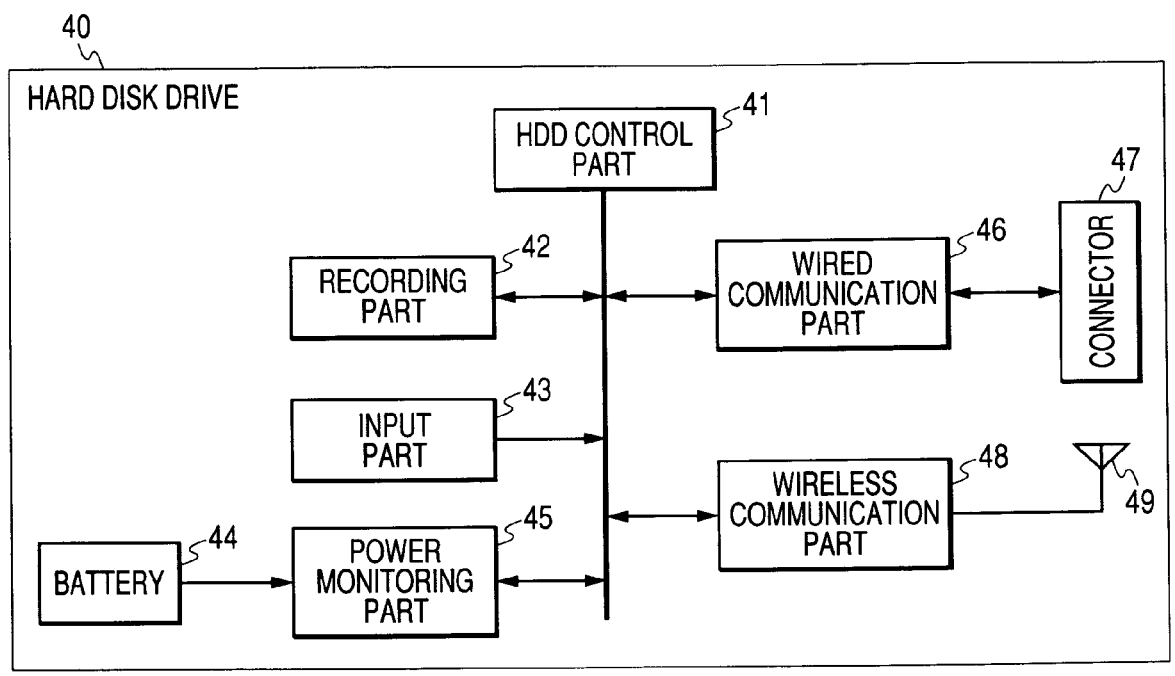
FIG. 14 is a diagram showing an internal configuration of the hard disk drive included in the image communication system according to the first embodiment of the present invention.

FIG. 14 is a diagram showing an internal configuration of the hard disk drive 40.

The hard disk drive 40 includes an HDD control part 41, a recording part 42, an input part 43, a battery 44, a power monitoring part 45, a wired communication part 46, a connector 47, a wireless communication part 48, and an antenna 49.

The HDD control part 41 administrates overall control of the hard disk drive 40, and physically includes a CPU, a ROM storing a control program, and a RAM. The HDD control part 41 performs analysis on a signal from the input part 43 and a control signal received through a wire or wirelessly, recording of a data signal in the recording part 42, power monitoring, and the like.

The recording part 42 includes a hard disk (HD) and a controller therefor, and performs recording of received image data, reading of data, and the like.

The input part 43 includes buttons for operating a power supply and the overall HDD. The battery 44 supplies overall power to the hard disk drive 40. The battery 44 may be adapted to supply power to the outside via the connector 47, or receive the supply of power from the outside.

The power monitoring part 45 measures a battery capacity, and notifies the HDD control part 41 of measuring results. The wired communication part 46 serves as a controller for the connector 47, monitors a connection state of the connector 47, and notifies the HDD control part 41 of monitoring results.

The connector 47 includes a plurality of connection terminals and power supply lines. The connector 47 sends/receives a control signal and data to/from another terminal.

The wireless communication part 48 has a function relating to Bluetooth wireless communications. The wireless communication part 48 receives a signal from the HDD control part 41, modulates the signal into an RF signal, and sends the RF signal to the antenna 49. The wireless communication part 48 demodulates an RF signal received from the antenna 49, and passes the resultant to the HDD control part 41.

The antenna 49 is used for sending/receiving an RF signal.

Next, description will be made of a specific operation performed between the PDA 10 and the digital camera 20.

FIG. 2 is a diagram showing an example of a list file that is registered in the PDA 10 and indicates storage device information, according to the first embodiment.

FIG. 3 is a flowchart showing a link control processing executed by the PDA 10.

First, a user causes the PDA 10 to load a communication control program in order to communicate by using the PDA 10. Then, the PDA 10 starts the link control processing shown in FIG. 3, and monitors a device search instruction operation or a link establishment instruction operation performed by the user (S100).

Here, when the user executes device search instruction operation for the PDA 10, the PDA 10 starts a device search operation for searching for a device within the communication coverage area 50 according to a procedure defined in the Bluetooth communication system (S101). After the device search operation is complete, a device function search operation for searching for a function provided to a retrieved device is executed (S102). After the device function search operation is complete, unique identification information and function information on devices found through the search are displayed in a list (S103). The PDA 10 waits until the user selects a desired device from the list and performs a link establishment instruction operation (S104).

When the user performs the link establishment instruction operation (S104), the PDA 10 establishes a communication link with the selected device according to a procedure defined in the Bluetooth communication system (S105). After the communication link establishment is complete, the PDA 10 performs a connected device information registration processing to check the function provided to the connected device. If the connected device has a function of storing data (storage function), the PDA 10 registers the connected device as a storage device, and if the connected device has no storage function, the PDA 10 does not perform such registration (S106). FIG. 2 shows storage device information stored in the PDA 10 by the connected device information registration processing.

Next, it is checked whether or not paring is to be performed between the connected device and the PDA 10. If there is a setting indicating that the pairing is to be performed (S107), the PDA 10 waits for a secret identification code (PIN code) to be inputted in order to perform the pairing, and when the PIN code is inputted (S108), a paring information registration processing is used to register the information including the PIN code in association with the storage device information registered in advance. If a connected device that is paired with the PDA 10 is not registered in the storage device information, the registration operation is not executed (S109).

After a series of operations for the link connection is complete, it is checked whether or not there is a request for a link connection with a new device (S110). If it is judged that there is no such request, the link control processing ends.

In the above processings relating to the link connection, description will be omitted of a communication channel establishment step for enabling the function provided to the device which is performed at each protocol level. In actuality, the communication channel establishment step of protocols corresponding to each function is executed.

According to the above description, the storage device information is registered after a link is established. However, a method of registering the storage device information is not limited to the above-mentioned method. It is possible that the user select an arbitrary storage device from devices detected by the device search operation, and the storage device information be registered before the link is established. Alternatively, it is possible that the user select a storage device from information on devices with which communications were performed in the past, and then the storage device information be registered.

Next, FIGS. 4 to 11 are used to describe a specific operation in which the PDA 10 remotely controls the digital camera 20.

Figure 4:
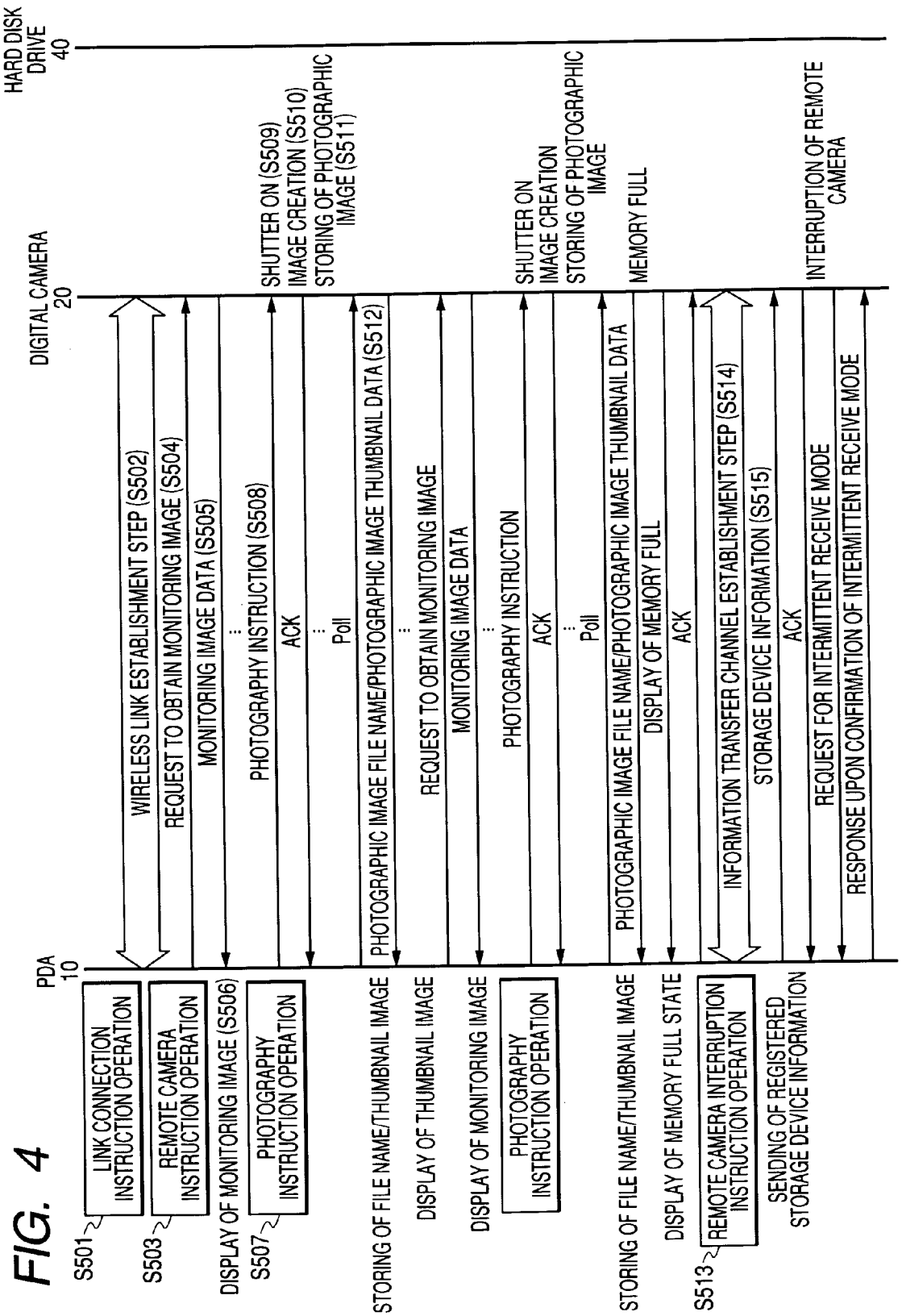
FIG. 4 is a sequential chart showing signals processed when communications are performed among the PDA, a digital camera, and a storage device according to the first embodiment of the present invention.
Figure 5:
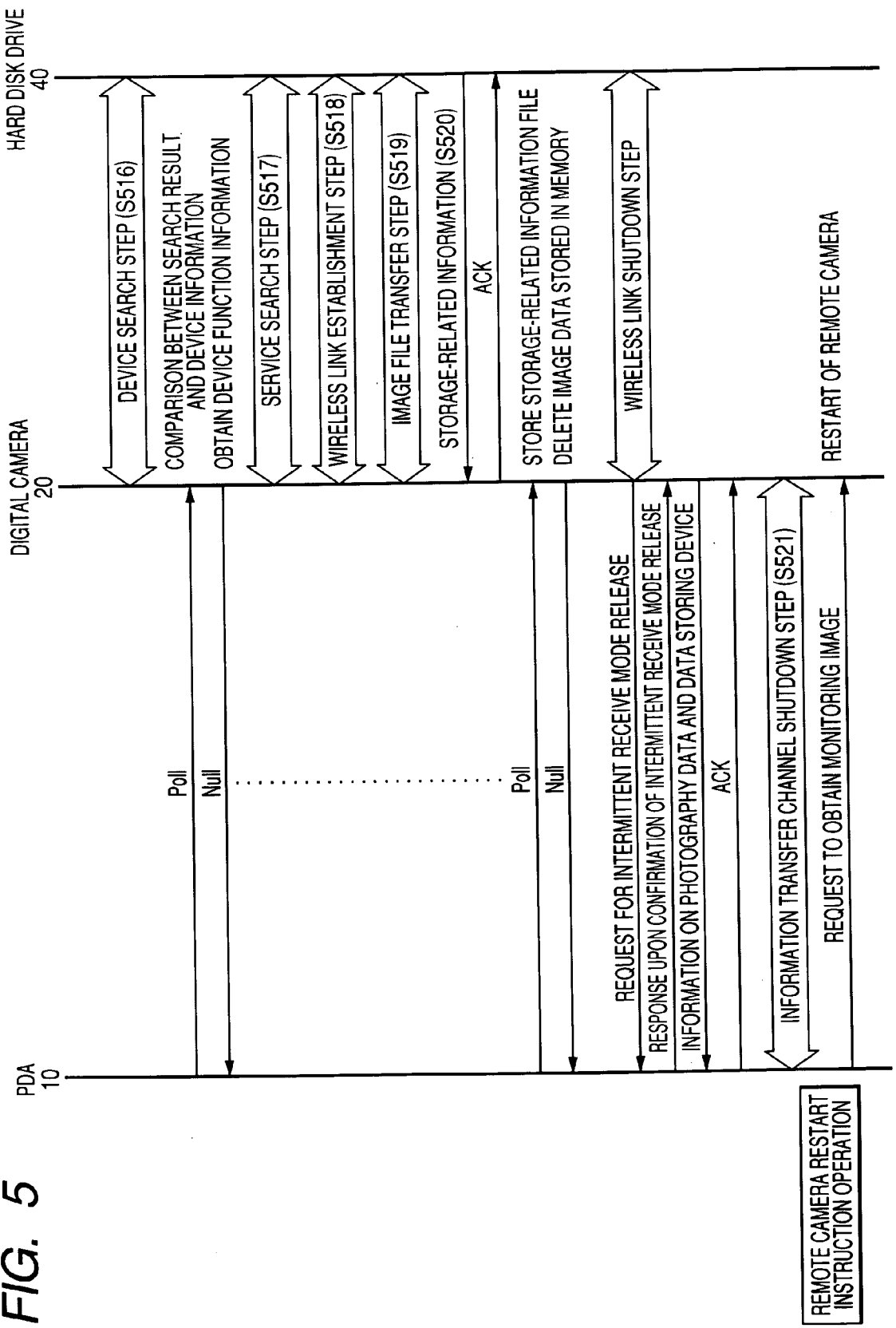
FIG. 5 is a sequential chart showing signals processed when communications are performed among the PDA, the digital camera, and the storage device according to the first embodiment of the present invention.

FIGS. 4 and 5 are sequential charts in the case where communications are performed among the PDA 10 serving as a control device, the digital camera 20, and the hard disk drive 40 serving as a storage device according to the first embodiment.

Note that the sequential charts shown in FIGS. 4 and 5 are sequential charts in the case of using a polling control system via the Bluetooth communication.

Figure 6B:
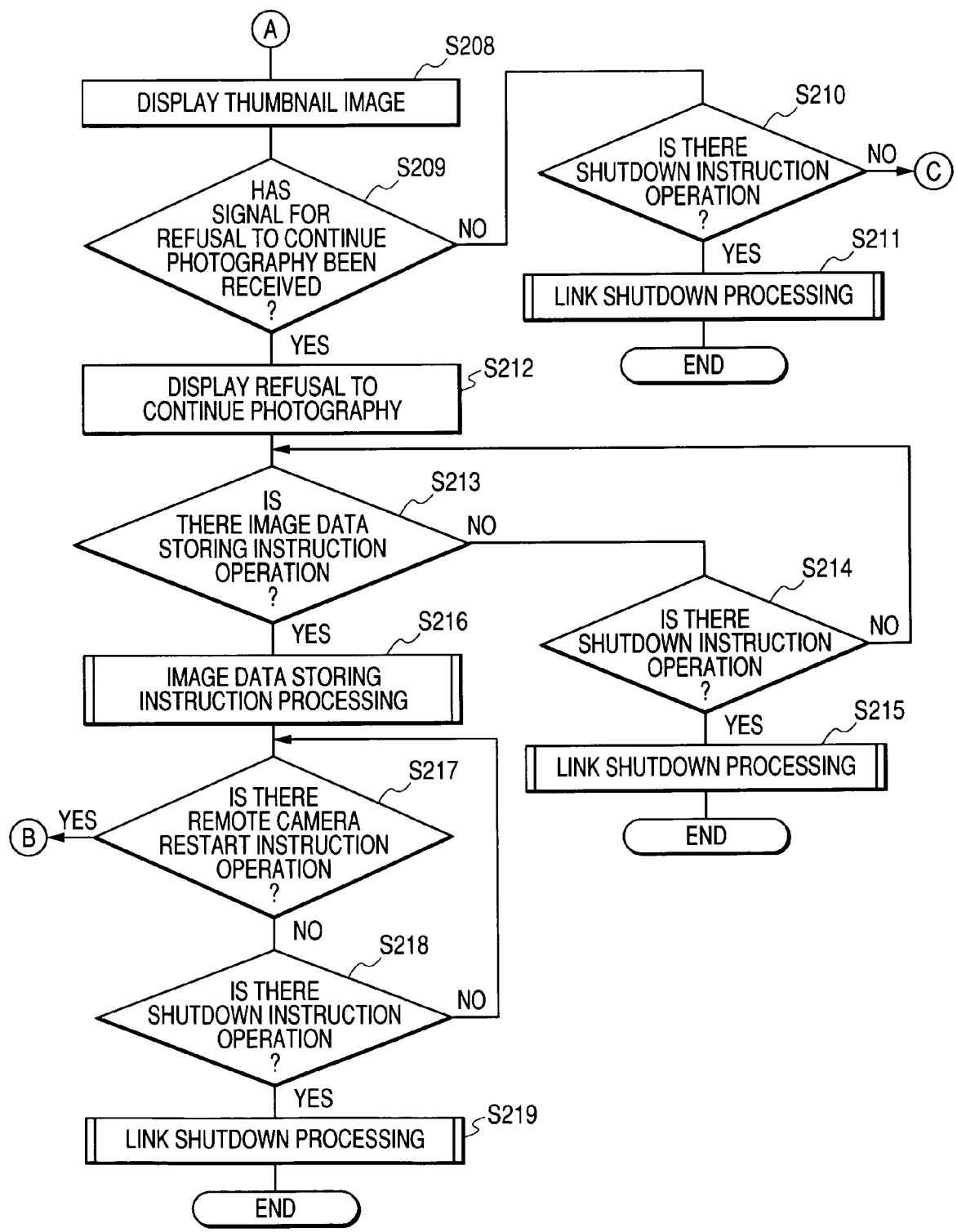
FIG. 6 is comprised of FIGS. 6A and 6B showing flowcharts illustrating an operation of the PDA for camera control according to the first embodiment of the present invention.
Figure 7:
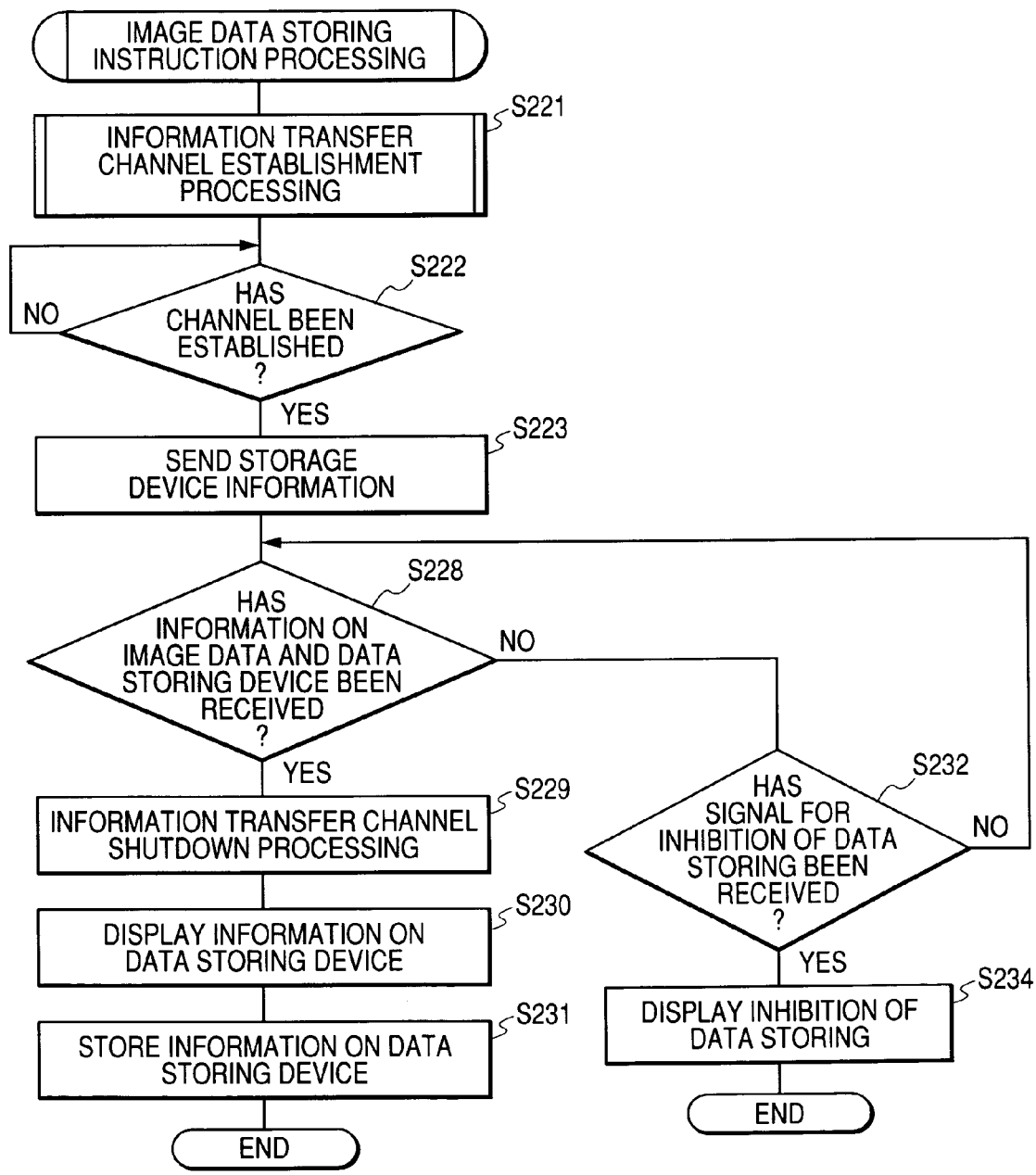
FIG. 7 is a flowchart showing an operation of the PDA for camera control according to the first embodiment of the present invention.

FIGS. 6A, 6B and 7 are flowcharts showing operations performed by the PDA 10 when the PDA 10 serving as a control device remotely controls the digital camera 20.

Figure 8:
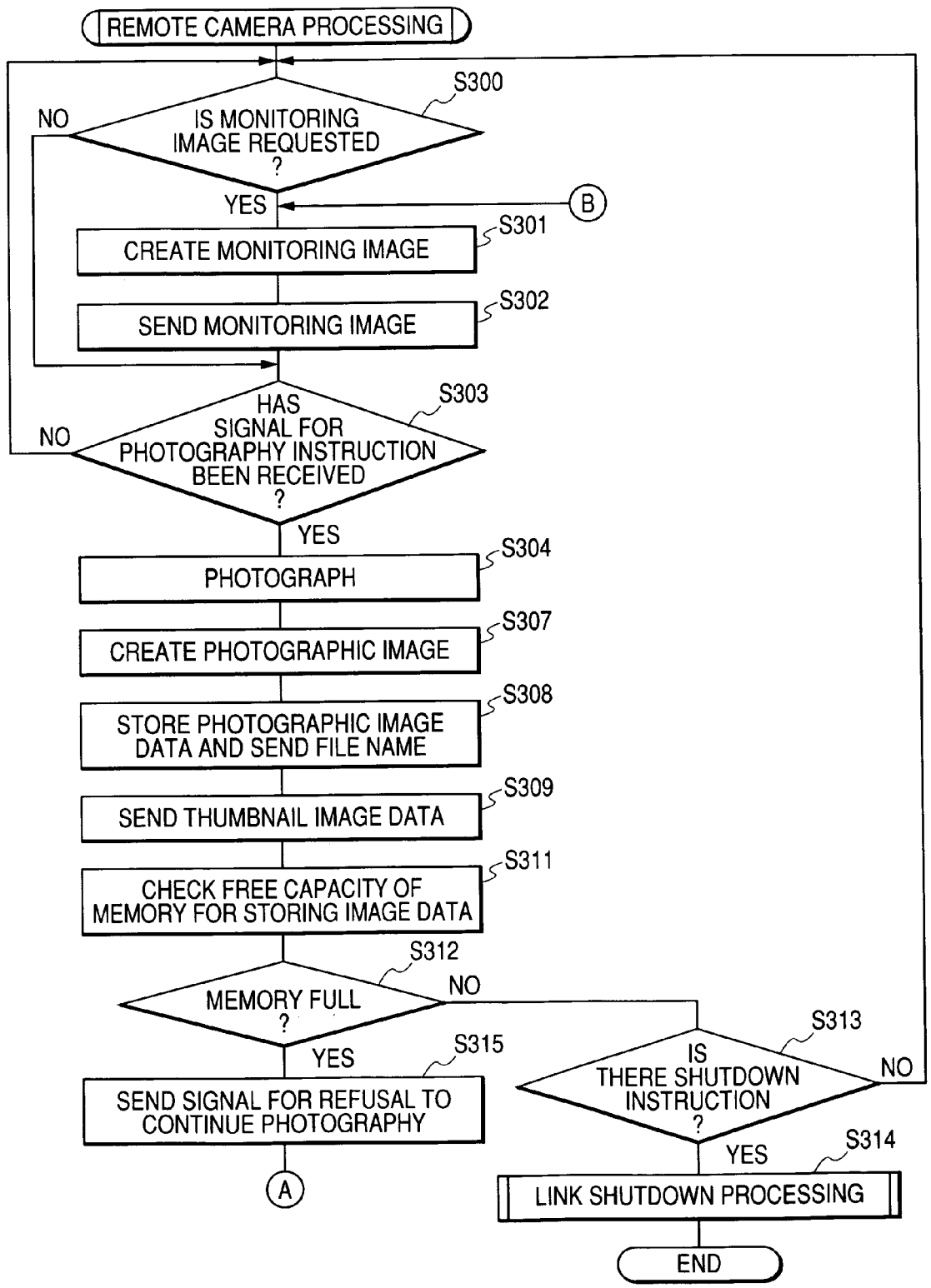
FIG. 8 is a flowchart showing an operation of the digital camera that is remotely controlled by the PDA according to the first embodiment of the present invention.
Figure 9:
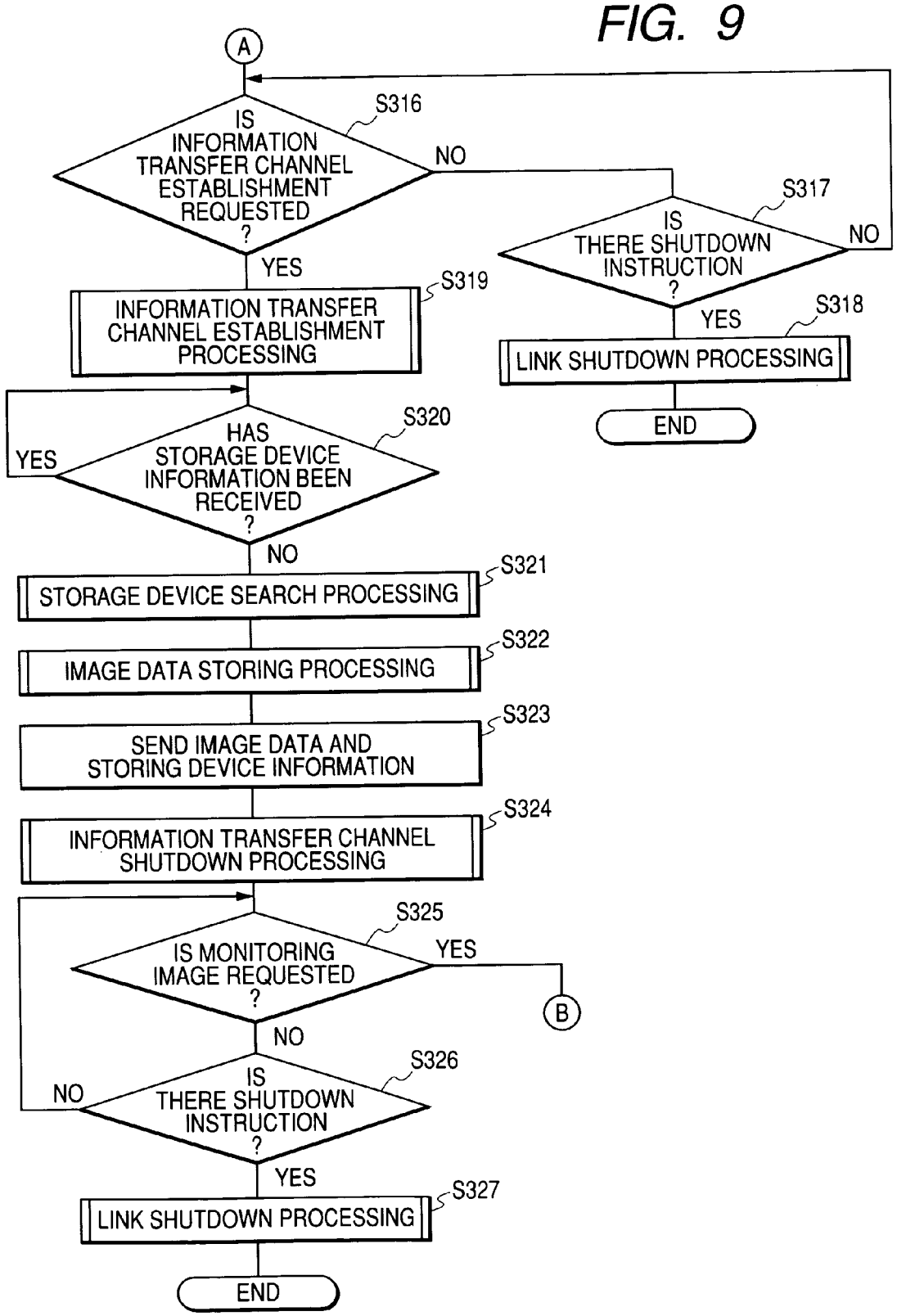
FIG. 9 is a flowchart showing an operation of the digital camera that is remotely controlled by the PDA according to the first embodiment of the present invention.

FIGS. 8 and 9 are flowcharts showing operations performed by the digital camera 20 when the PDA 10 remotely controls the digital camera 20.

Figure 10:
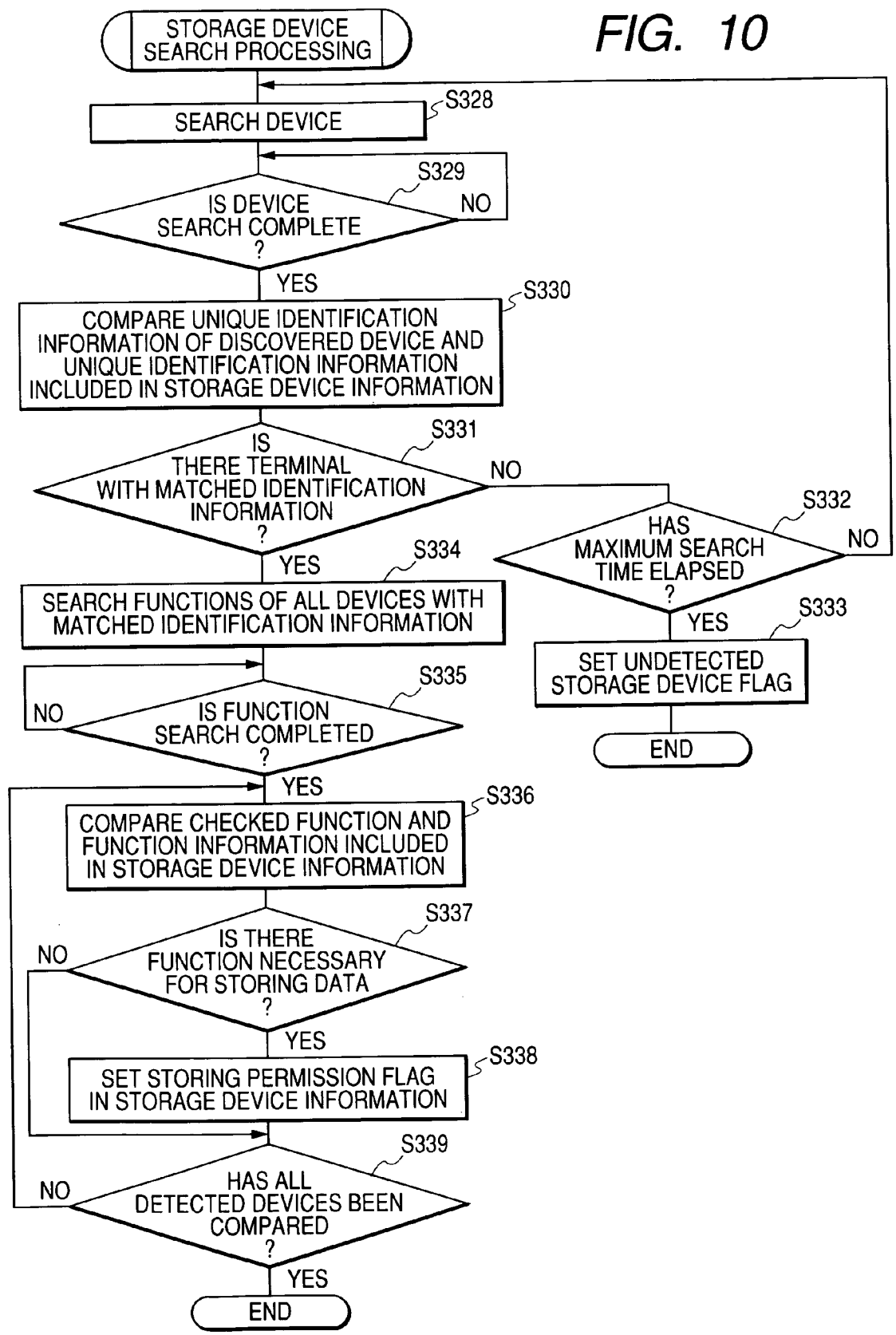
FIG. 10 is a flowchart showing a device search operation for a storage device which is executed by the digital camera according to the first embodiment of the present invention.

FIG. 10 is a flowchart showing the device search operation performed when the digital camera 20 searches for a storage device to which image data is to be stored.

Figure 11:
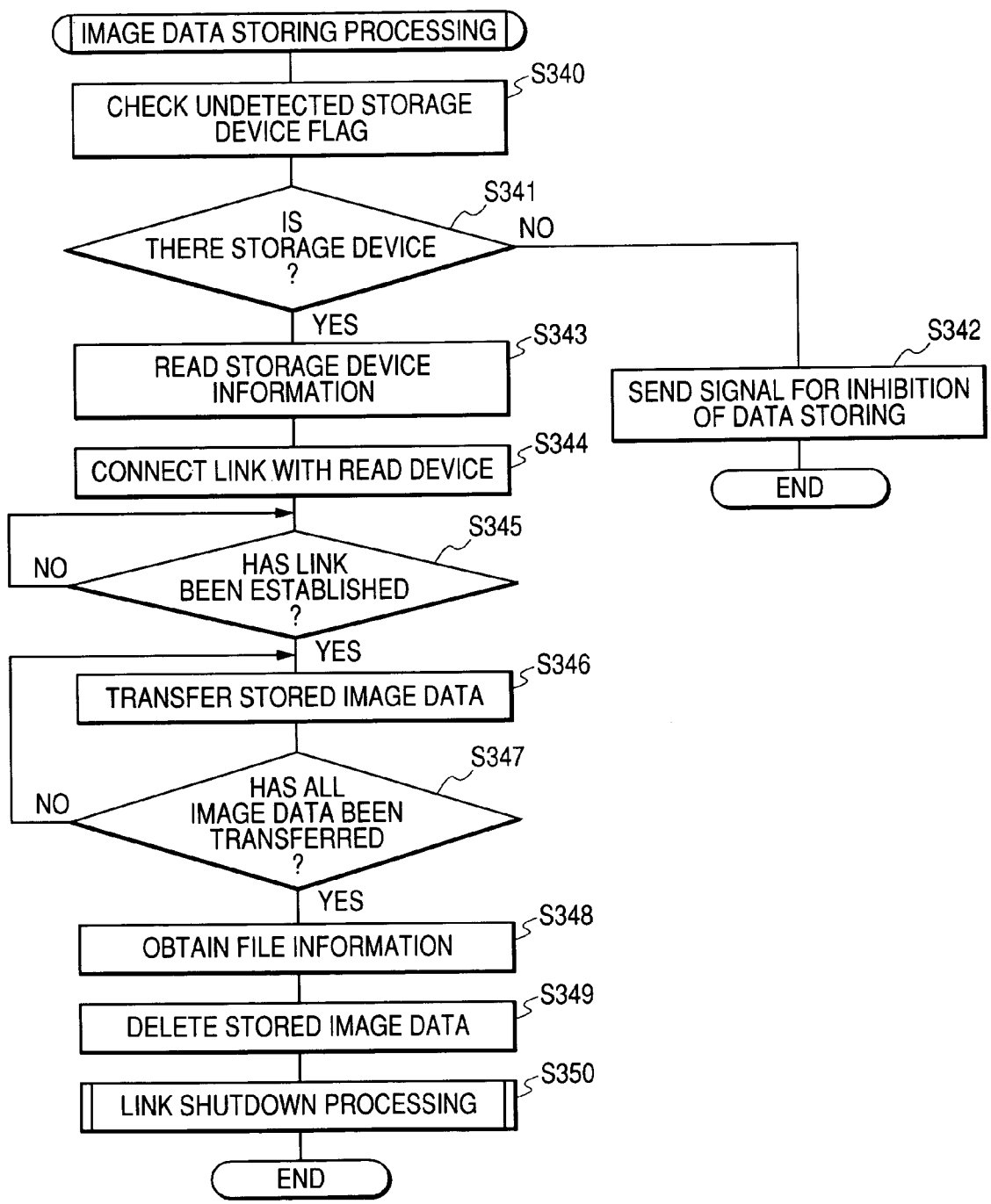
FIG. 11 is a flowchart showing an image data storing operation for a storage device which is executed by the digital camera according to the first embodiment of the present invention.

FIG. 11 is a flowchart showing an image data storing operation performed when the digital camera 20 stores the image data in the storage device.

When the user of the PDA 10 operates a link connection instruction to connect with the digital camera 20 (S501), a wireless link is established between the PDA 10 and the digital camera 20 (S502).

After that, when an operation for giving an instruction to a remote camera is performed on the PDA 10 (S503 and S200), the PDA 10 sends a request to obtain a monitoring image to the digital camera 20 (S504 and S201).

Upon receiving a signal for the request to obtain a monitoring image (S300), the digital camera 20 creates the monitoring image (S301), and sends the monitoring image to the PDA 10 (S505 and S302).

When the PDA 10 receives the monitoring image from the digital camera 20 and then transfer thereof is complete (S202), the received monitoring image is displayed (S506 and S203).

The above series of operations is repeated until a photography instruction operation is performed on the PDA 10.

When the photography instruction operation is performed on the PDA 10 (S507 and S204), a photography instruction signal is sent to the digital camera 20 (S508 and S205).

The digital camera 20 having received the photography instruction signal (S303) releases a shutter, performs photography (S509 and S304), and creates photographic image data (S510 and S307) while sending a response (ACK), which indicates that the photography has been performed, to the PDA 10. Then, the digital camera 20 sets a file name to the created image data, stores the image data in the memory M2 (S511), responds to a poll packet sent from the PDA 10, and sends to the PDA 10 the file name of the stored photographic image data and thumbnail image data of the stored image data (S512, S308, and S309).

Upon receiving the ACK sent from the digital camera 20 and the file name and thumbnail image data of the photographic image data (S206 and S207), the PDA 10 displays the received thumbnail image on a monitor (S208).

The digital camera 20 checks the free capacity of the memory M2 (memory provided to the digital camera 20) after storing the photographic image data, and determines the size of a free area of the memory M2 (S311). If the free area has a sufficient size (S312), it is judged whether or not a link shutdown instruction is sent from the PDA 10 (S313). If the link shutdown instruction is not received (S313), the digital camera 20 monitors the above-mentioned request to obtain a monitoring image (S300), and if the link shutdown instruction is received (S313), the digital camera 20 performs a link shutdown processing for shutting down the link with the PDA 10 (S314).

Alternatively, if the free area has an insufficient size as a result of checking the free capacity of the memory M2 in step S312 (S312), the digital camera 20 sends a signal for refusal to continue photography, which indicates that the photography cannot be continued, to the PDA 10 (S315).

After displaying the thumbnail (S208), the PDA 10 judges whether or not the signal for refusal to continue photography has been sent from the digital camera 20 (S209). If the signal has not been sent, the PDA 10 monitors the link shutdown instruction operation performed by the user (S210). The user of the PDA 10 views the displayed thumbnail, and performs the link shutdown processing for shutting down the link with the digital camera 20 in order to end the photography (S211). When the link shutdown processing is performed (S210), the PDA 10 sends a link shutdown instruction signal to the digital camera 20, and performs the link shutdown processing (S211). If the signal for refusal to continue photography has not been received from the digital camera 20 and if the link shutdown processing is not performed, the procedure returns to step S201, and the PDA 10 sends another request to obtain a monitoring image.

Upon receiving the signal for refusal to continue photography in step S209, the PDA 10 displays the fact that the digital camera 20 has refused to continue the photography due to the insufficient free capacity (S212) of the memory M2 of the digital camera 20. Then, the PDA 10 interrupts the remote photography, and monitors an image data storing instruction operation for transferring the image data stored in the digital camera 20 to a storage device and the link shutdown instruction operation (S213 and S214).

When the link shutdown instruction operation is performed (S214), the PDA 10 sends the link shutdown instruction signal to the digital camera 20, and performs the link shutdown processing (S215). Alternatively, when the image data storing instruction operation is operated (S513 and S213), the PDA 10 executes an image data storing instruction processing shown in FIG. 7 (S216).

In the image data storing instruction processing shown in FIG. 7, the PDA 10 reads the storage device information registered in advance out of the memory, and performs an information transfer channel establishment processing in order to transfer the read storage device information to the digital camera 20 (S514 and S221). After an information transfer channel with the digital camera 20 is established (S222), the PDA 10 transfers the storage device information read out in advance (for example, storage device information about the laptop computer 30 and the hard disk drive 40) to the digital camera 20 (S515 and S223).

After sending the signal for refusal to continue photography, the digital camera 20 monitors an information transfer channel establishment request and the link shutdown instruction signal (S316 and S317 of FIG. 9). Upon receiving the information transfer channel establishment request for the transfer of the storage device information (S316), the digital camera 20 performs the information transfer channel establishment processing with respect to the PDA 10 (S514 and S319), and receives the storage device information from the PDA 10 via the established information transfer channel (S320).

Upon receiving the storage device information, the digital camera 20 executes a storage device search processing shown in FIG. 10 (S321). Alternatively, upon receiving the link shutdown instruction signal (S317), the digital camera 20 performs the link shutdown processing with respect to the PDA 10 (S318). Note that when the digital camera 20 receives the storage device information from the PDA 10 and starts the storage device search processing, the digital camera 20 requests the PDA 10 for transit to an intermittent receive mode, and starts to intermittently receive a signal from the PDA 10.

In the storage device search processing shown in FIG. 10, the digital camera 20 executes an operation for searching for a device within the communication coverage area 60 according to a device search operation defined in the Bluetooth communication system (S516 and S328).

After the device search operation is complete (S329), the digital camera 20 compares unique identification information on a device discovered through the search (unique identification information on the hard disk drive 40, which is discovered as the device existing in the communication coverage area 60) and unique identification information included in the storage device information obtained from the PDA 10 in advance (S330), and checks whether or not there is a device with matched identification information (S331).

Here, if the device included in the storage device information cannot be detected, it is judged whether or not a maximum device search time, which is set in advance, has elapsed (S332). If the maximum device search time has not elapsed, the device search operation is repeated again. Alternatively, even after the maximum device search time has elapsed, when the device included in the storage device information cannot be found (S332), the digital camera 20 sets an undetected storage device flag to store the fact that the storage device is undetected as a result of the device search. Then, the series of processings ends (S333).

On the other hand, if the device matched with the storage device information received from the PDA 10 is detected (S331), the function search is performed for all the matched devices according to a procedure defined in the Bluetooth communication system (S517 and S334). After the function search for all the devices is complete (S335), the digital camera 20 compares the function included in the storage device information received from the PDA 10 and the function found through the function search (S336), and checks whether or not the device has a function necessary for storing data (S331). If it is judged that the device has the function necessary for storing data (S337), the digital camera 20 sets a storing permission flag to the storage device information of the device (S338) to indicate that the device is effective in storing data.

It is judged whether or not the comparison of the function for all the devices is complete (S339). If the comparison is not complete, the function comparison processing is performed on the remaining devices, and after comparison for all the devices is complete, the procedure advances to an image data storing processing shown in FIG. 11 (S322).

In the image data storing processing of FIG. 11, the digital camera 20 checks the undetected storage device flag for the storage device (S340), and judges whether or not there is a storage device (S341). If it is judged that there is no storage device, the digital camera 20 uses the information transfer channel used previously for obtaining the storage device information, to send a signal for inhibition of data storing to the PDA 10 and end the processing (S342).

Alternatively, if there is a storage device, the digital camera 20 reads out the storage device information in which the storing permission flag is set (if there are plural storage devices, reads out one selected from the plural storage devices) (S343), and according to a procedure defined in the Bluetooth communication system, uses the unique identification information of the read storage device information to request the storage device for a link connection therewith and execute a link establishment operation (S518 and S344). Note that in this embodiment, the storage device that exists in the communication coverage area of the digital camera 20 is the hard disk drive 40, so that the link establishment is made with the hard disk drive 40.

After the link establishment with the hard disk drive 40 is complete (S345), the digital camera 20 transfers the image data stored in the memory M2 to the hard disk drive 40 (S519 and S346), and the processing (S519 and S347) is repeated until the transfer of all the image data files is complete.

After the transfer of all the image data files is complete, the digital camera 20 obtains information on the stored image data (for example, information including a data storing directory) from the storage device information of the device (hard disk drive 40) storing the image data (S520 and S348).

After the information on the image data stored in the hard disk drive 40 is obtained from the hard disk drive 40, the image data stored in the hard disk drive 40 is deleted from the memory M2 (S349), the link is shut down from the hard disk drive 40, thereby ending the image data storing processing (S350).

After the image data storing processing ends, the digital camera 20 requests the PDA 10 to end the intermittent receive. After the intermittent receive ends, the digital camera 20 sends to the PDA 10 the storage device information of the storage device (hard disk drive 40) storing the image data and the image data information (information including a file name and a data storing directory of the storing destination) stored in the storage device (hard disk drive 40) (S323 of FIG. 9), and then shuts down the information transfer channel with respect to the PDA 10 (S324).

After that, the digital camera 20 monitors a remote camera control signal (request to obtain a monitoring image) and link shutdown instruction signal that are sent from the PDA 10 (S325 and S326), and upon reception of the link shutdown instruction (S326), shuts down the link from the PDA 10 (S327).

On the other hand, in step S223 of FIG. 7, when the PDA 10 receives a request to release the intermittent receive mode, to which the transit was made after sending the storage device information, from the digital camera 20, the PDA 10 releases the intermittent receive performed by the digital camera 20. After the release of the intermittent receive, the PDA 10 receives from the digital camera 20 the information on the image data stored in the hard disk drive 40 by the digital camera 20 and the storage device information on the storage device (hard disk drive 40) storing the image data (S228), and then shuts down the information transfer channel with respect to the digital camera 20 (S229).

After shutting down the information transfer channel, the PDA 10 displays and stores the information received from the digital camera 20 (the information on the image data stored in the hard disk drive 40 by the digital camera 20 and the storage device information on the storage device (hard disk drive 40) storing the image data) (S230 and S231). Also, after the release of the intermittent receive, in the case where the digital camera 20 receives the signal for inhibition of data storing which is sent in step S342 of FIG. 11 (S232), the PDA 10 displays the fact that the image data of the digital camera 20 cannot be stored in another device (S234).

Further, after the image data storing instruction processing ends, the PDA 10 monitors a remote camera restart operation and link shutdown operation that are performed by the user (S217 and S218 of FIGS. 6A and 6B).

Here, if the user performs the remote camera restart operation, the procedures returns to step S201. Alternatively, if the user performs the link shutdown operation, the PDA 10 shuts down the link with respect to the digital camera 20 (S219).

Note that in the intermittent receive, in the case where the digital camera 20 establishes the link with the hard disk drive 40 and performs the image data storing processing, there are extremely small amount of data traffic that is necessary for the communications between the PDA 10 and the digital camera 20. Thus, the intermittent receive is effectively used for the communications between the digital camera 20 and the PDA 10 in order to reduce a communication amount while maintaining the state of the link.

Further, according to the above description, the request for the intermittent receive is made from the digital camera 20 to the PDA 10. However, in an inverse manner, the request for the intermittent receive may be made from the PDA 10 to the digital camera 20.

Further, according to the above description, the transit to the intermittent receive mode is made before the device search operation performed by the digital camera 20. However, the transit to the intermittent receive mode may be made after the device search is performed and the storage device is detected.

Second Embodiment

According to the first embodiment, all the image data files stored in the digital camera 20 are automatically stored in the hard disk drive 40, and then all the image data stored in the memory M2 is deleted. However, the present invention is not limited thereto.

A second embodiment is for showing a method in which the PDA 10 obtains the image data information stored in the digital camera 20, and only the image data selected by the user is stored in the hard disk drive 40.

In the same procedure as that of the first embodiment, the PDA 10 is used to perform the remote camera control on the digital camera 20 and execute the photography operation.

After the photography operation is complete and the PDA 10 obtains the file name and thumbnail file of the photographic image data from the digital camera 20, the PDA 10 receives the signal for refusal to continue photography. Then, the PDA 10 temporarily interrupts a remote camera control operation, and requests the digital camera 20 for obtaining the file list of the image data stored in the digital camera 20. The PDA 10 displays the obtained file list on the monitor to prompt the user to select images. The selection of the image may be made, for example, by designating individual images or by collectively selecting the images based on the photographic date. The selected images are stored as a selected image file.

Then, in the same manner as in the first embodiment, the information transfer channel is established between the PDA 10 and the digital camera 20, and the storage device information is transferred, followed by the transfer of the selected image file that is previously stored. Upon reception of the storage device information and the selected image file, the digital camera 20 follows the same procedure as that of the first embodiment to select the storage device and connects the link. Then, based on the information of the selected image file, the digital camera 20 selects the image data stored in the memory, and transfers the image selected by the user to the storage device.

After the transfer of the image data is complete, the digital camera 20 transfers the storage device information on the device storing the image data and the information on the image data stored in the storage device, to the PDA 10 via the information transfer channel, and deletes only the image data that is stored in the memory M2 and has been transferred.

Therefore, only the image data desired by the user is stored in another device, and can be deleted from the memory.

Further, the method of deleting the image data that is transferred and stored is not limited to the above-mentioned method, and the image data stored in the storage device may be deleted in response to an instruction from the PDA 10.

Further, in this embodiment, the image data of the digital camera 20 is stored in the storage device at a timing when the signal for refusal to continue photography is received from the digital camera 20. However, this storing timing is not limited to the above-mentioned timing. The PDA 10 may be provided with means for causing the information transfer channel to be established at an arbitrary timing, and the image data may be stored in the storage device by allowing the information transfer channel to be established when the user performs an operation at an arbitrary timing.

Further, in the above embodiments, the Bluetooth communication system is used to perform the communications between the devices. However, other wireless systems, for example, a wireless LAN represented by IEEE 802.11 and a communication system used in an ultra wideband or the like may be used.

Furthermore, in the above embodiments, the wireless communication system is adopted as communication means. However, a wired communication system may be adopted.

In addition to the above embodiments, if means for activating the operation of storing an image in the storage device and means for selecting whether or not the data transferred to the storage device is deleted from data storing means are provided, the data can be stored at an arbitrary timing regardless of a free area of the memory of the digital camera 20. Accordingly, the user can back up data with ease.

According to the above embodiments, it is easy to perform the migration and backup of the image data stored in the digital camera to the storage device, eliminating the user from troublesome operations. Accordingly, an effect is produced in that the remote camera control environment with high convenience can be provided.

Further, by migrating the image data selected by the user to the storage device, the time for transferring the image data can be reduced. Accordingly, the case where the user intends to use the remote camera control function promptly and other such cases can be handled flexibly.

Third Embodiment

Figure 15:
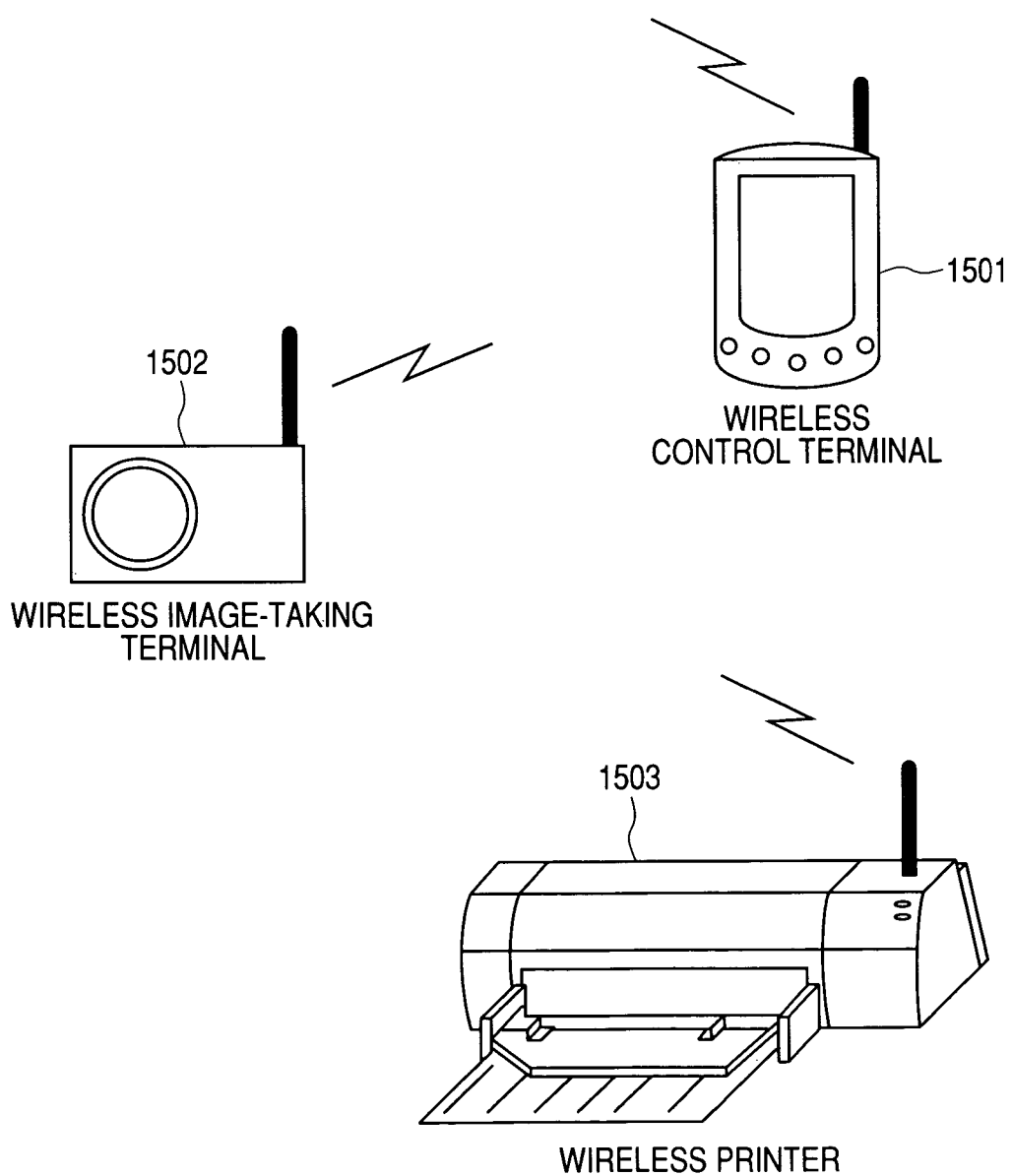
FIG. 15 is a diagram schematically showing a configuration of a system including a wireless control terminal and devices having a wireless function with which the wireless control terminal communicates, according to a third embodiment of the present invention.
Figure 16:
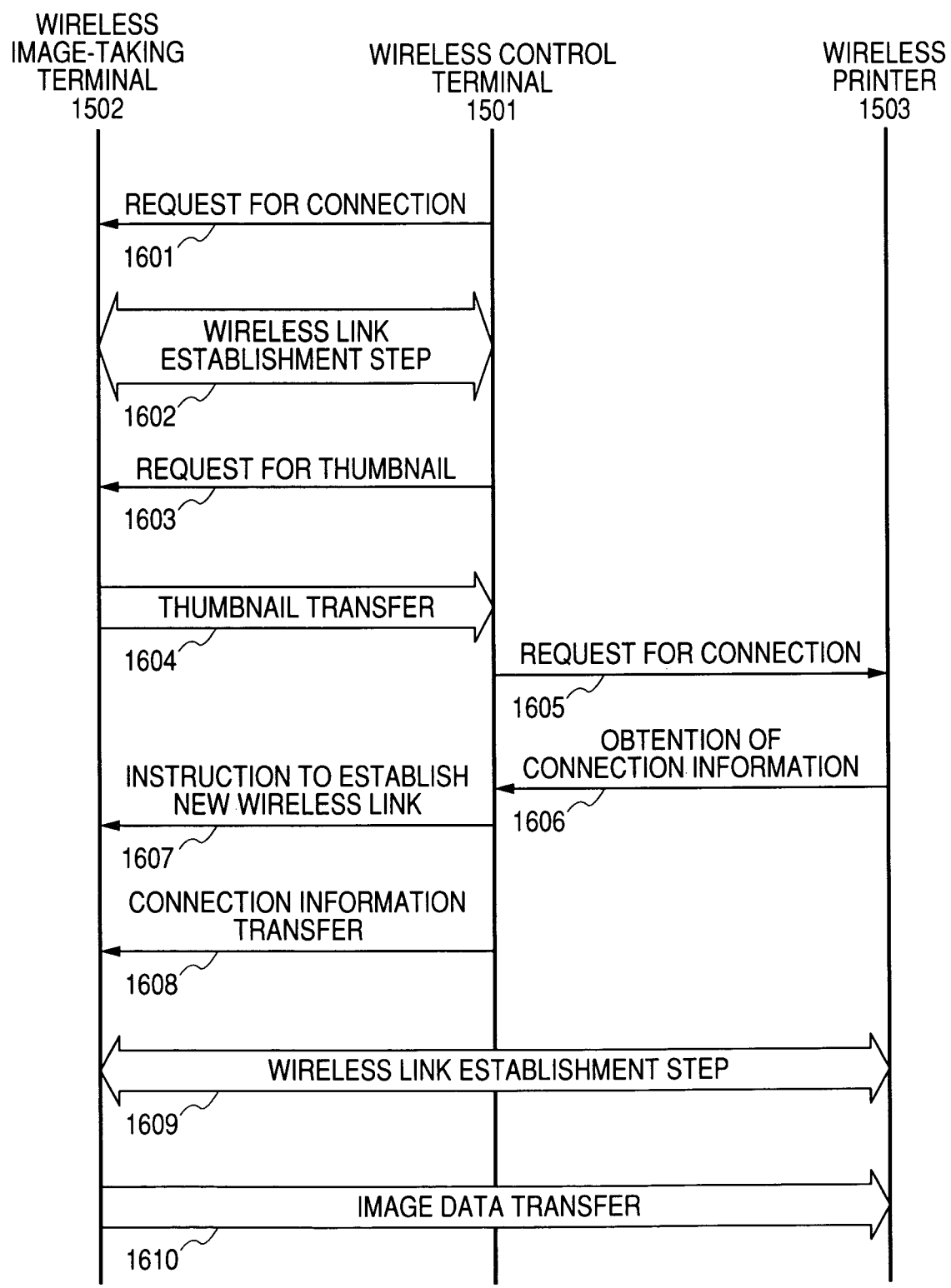
FIG. 16 is a diagram showing a sequence in which an image taken by a wireless image-taking terminal is printed by a wireless printer according to the third embodiment of the present invention.

FIG. 15 is a diagram schematically showing a configuration of a system including a wireless control terminal and devices having a wireless function with which the wireless control terminal communicates, according to a third embodiment of the present invention. FIG. 16 is a diagram showing a sequence in which an image taken by a wireless image-taking terminal 1502 is printed by a wireless printer 1503 in the system of FIG. 15.

As shown in FIG. 15, the system of this embodiment includes a wireless control terminal 1501, a wireless image-taking terminal 1502, and a wireless printer 1503. Those devices each have a wireless communication function of a shared system, and can communicate with one another. In the wireless connections among the devices, a profile is defined for each of their connection purposes, and the connections are allowed only via the profiles corresponding to one another. In this embodiment, the Bluetooth is used as the wireless system, but does not limit the present invention. Any other systems may be used as long as they are wireless systems in which a profile is defined for each of connection purposes.

The wireless control terminal 1501 and the wireless image-taking terminal 1502 can be connected to each other via a basic imaging profile (BIP) of the Bluetooth, and the wireless control terminal 1501 can perform operation control of the wireless image-taking terminal 1502, obtention of an image therefrom, or the like. The wireless printer 1503, which is also compatible with the BIP, is connected to the wireless image-taking terminal 1502, so that the direct printing of a photographic image can be performed without using a PC or the like.

Here, a situation is assumed in which the image taken by the wireless image-taking terminal 1502 is confirmed on the wireless control terminal 1501, and a particular image is printed by the wireless printer 1503. With regard to operations for this situation, description will be made of an operation mode according to this embodiment in contrast to the conventional operation mode.

In the case of the conventional operation mode, it is normal that the wireless control terminal 1501 becomes a master to establish a wireless link with the wireless image-taking terminal 1502 via the BIP, and obtains the thumbnail image of an image stored in a memory mounted to the wireless image-taking terminal 1502. After that, the user checks a file name or the like of the image to be printed from the thumbnail image confirmed on the wireless control terminal 1501. Then, the user returns to the wireless image-taking terminal 1502 for operations, and establishes a wireless link between the wireless image-taking terminal 1502 and the wireless printer 1503 via the BIP. By operating the wireless image-taking terminal 1502, the image file confirmed on the wireless control terminal 1501 is searched for, and an instruction to print is issued to the wireless printer 1503. This procedure is troublesome, where the user must perform two operations on the wireless control terminal 1501 and the wireless image-taking terminal 1502.

In contrast, in the case of the operation mode according to this embodiment, as shown in FIG. 16, a request for connection is first issued from the wireless control terminal 1501 to the wireless image-taking terminal 1502 (1601). Then, a wireless link is established between the wireless control terminal 1501 and the wireless image-taking terminal 1502 according to a defined procedure (1602). The details of the procedure for the wireless link establishment are standardized strictly, so that their description will be omitted.

Next, a request for thumbnail image data for viewing an image stored in the memory mounted to the wireless image-taking terminal 1502 is issued from the wireless control terminal 1501 to the wireless image-taking terminal 1502 (1603). In response to this request, the thumbnail image data is actually sent from the wireless image-taking terminal 1502 to the wireless control terminal 1501 (1604). The wireless control terminal 1501 also sends out a request for connection to the wireless printer 1503 (1605), and obtains information necessary for actual connection from the wireless printer 1503 (1606). Note that in the Bluetooth communications, the information necessary for actual connection with a counterpart can be collected without establishing the wireless link between terminals. In other words, after a device search operation defined in the Bluetooth communications is performed, another search operation can be performed on the device found by this search operation, for a function (such as a printer function or storage function) provided to the device. Accordingly, the procedure is not necessarily executed for establishing the wireless link between the wireless control terminal 1501 and the wireless printer 1503, thereby omitting its drawings. Further, a negotiation processing between the wireless control terminal 1501 and the wireless printer 1503 may be performed before the connection processing with the wireless image-taking terminal 1502.

After that, when the user views thumbnail images on the wireless control terminal 1501 and designates an image to be printed, an instruction to establish a new wireless link with the wireless printer 1503 is sent out from the wireless control terminal 1501 to the wireless image-taking terminal 1502 (1607). Then, along with the designation of the image to be printed, information necessary for connection between the wireless image-taking terminal 1502 and the wireless printer 1503, which has already been obtained from the wireless printer 1503, is sent out to the wireless image-taking terminal 1502 (1608). An operation trigger for the actual instruction to establish a new wireless link may be simply realized by a button click made on a user interface of the wireless control terminal 1501 or the like.

Based on the information obtained from the wireless control terminal 1501, the wireless image-taking terminal 1502 performs establishment of a wireless link with the wireless printer 1503 (1609). The establishment between the wireless image-taking terminal 1502 and the wireless printer 1503 is performed based on the information necessary for the connection between the wireless image-taking terminal 1502 and the wireless printer 1503, which is obtained from the wireless control terminal 1501, thereby being instantaneously performed without performing the negotiation processing. Then, the wireless image-taking terminal 1502 transfers the designated image data (1610). The wireless printer 1503 receives the image data transferred from the wireless image-taking terminal 1502, and performs printing on the image data.

Therefore, according to this embodiment, the wireless control terminal 1501 obtains the information necessary for the actual connection with the wireless printer 1503, and sends out the information to the wireless image-taking terminal 1502. When the wireless image-taking terminal 1502 establishes a wireless link with the wireless printer 1503 to transfer the image data to the wireless printer 1503, the procedures for establishing a wireless link and for transferring the image data are performed based on the above information obtained from the wireless control terminal 1501. Accordingly, it is possible to realize a wireless connection service that is constantly optimum without performing troublesome operations even if the form of the wireless connection service becomes complicated.

Fourth Embodiment

Figure 17:
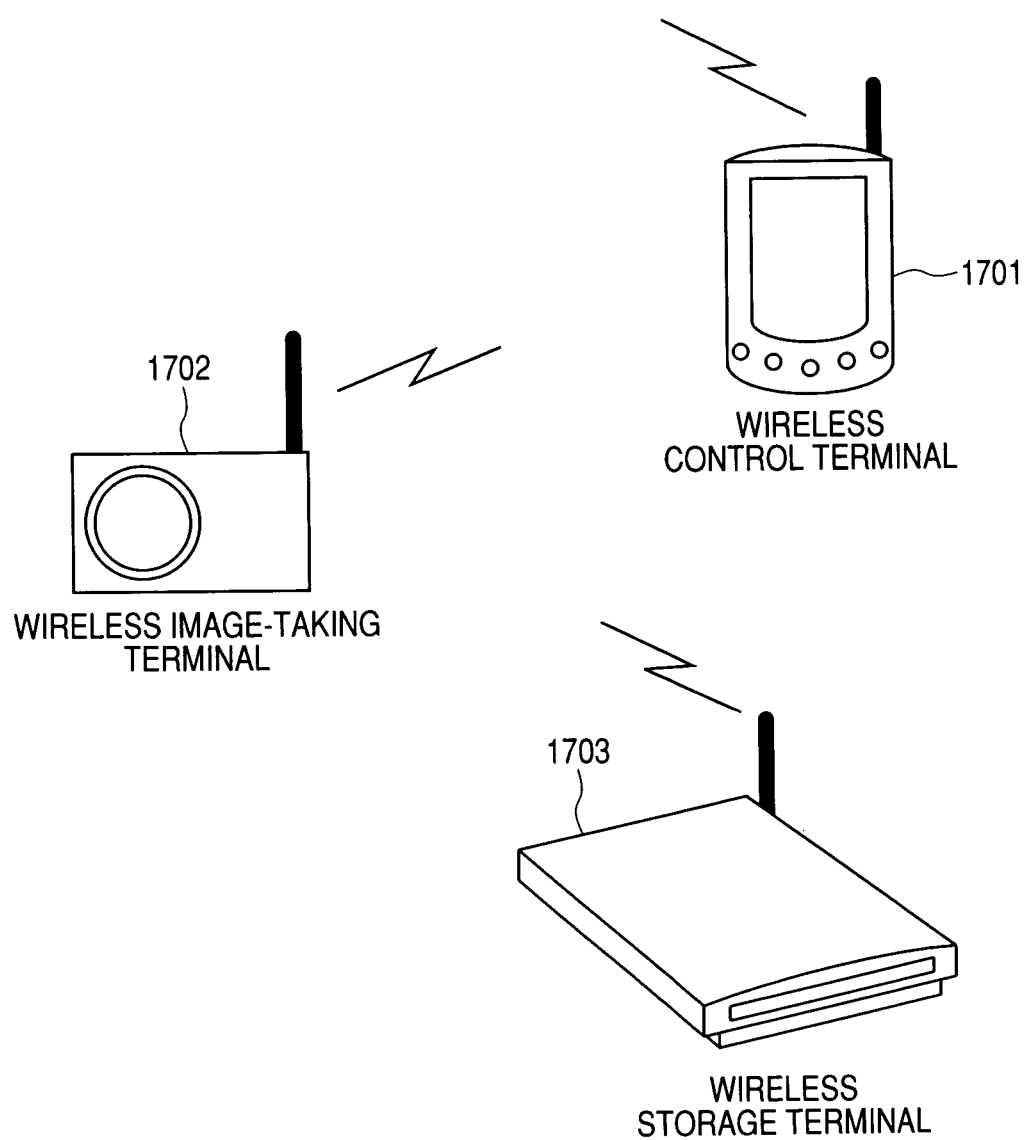
FIG. 17 is a diagram schematically showing a configuration of a system including a wireless control terminal and devices having a wireless function with which the wireless control terminal communicates, according to a fourth embodiment of the present invention.
Figure 18:
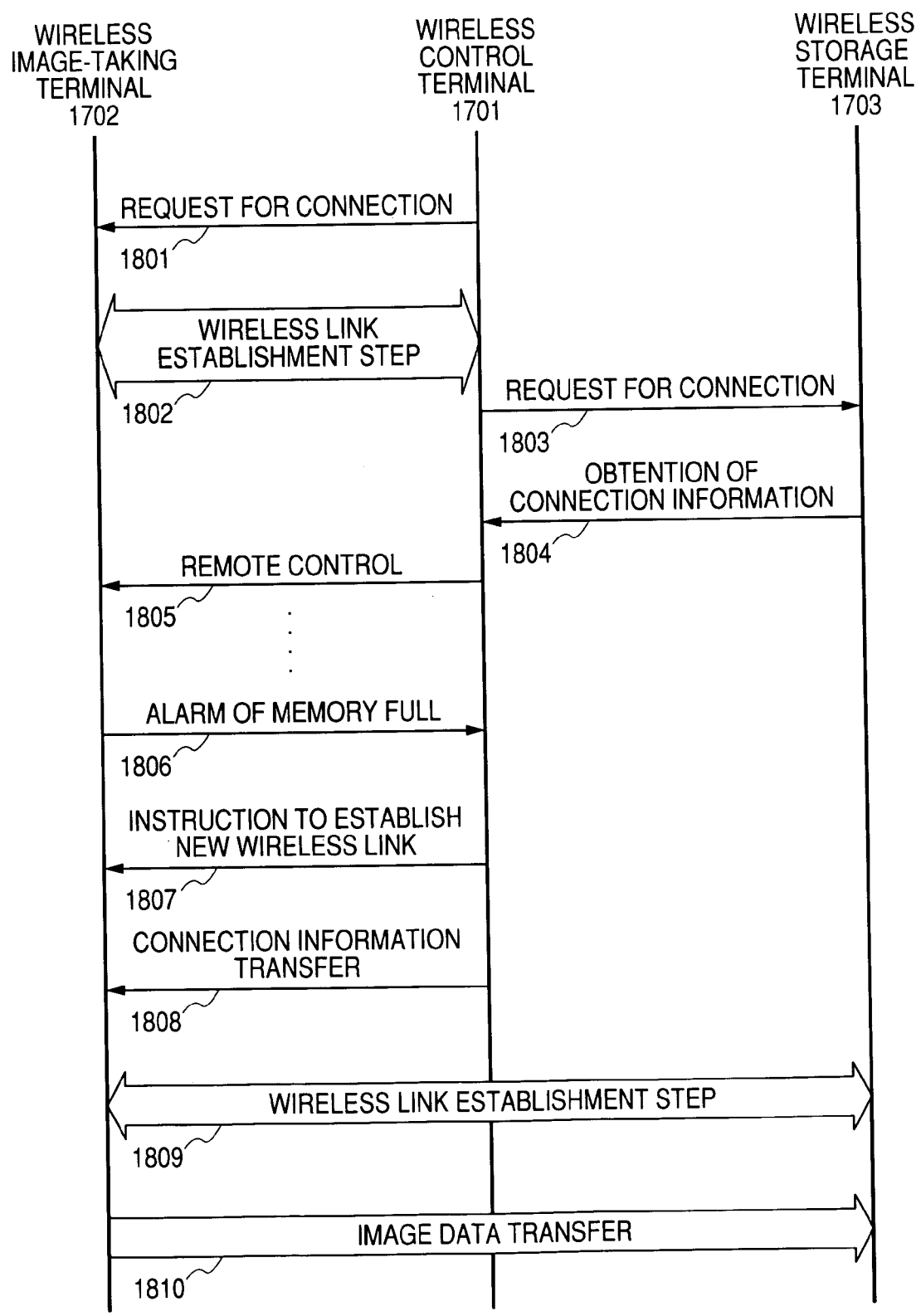
FIG. 18 is a diagram showing a sequence in which an image taken by a wireless image-taking terminal is stored in a wireless storage terminal according to the fourth embodiment of the present invention.

Next, description will be made of a fourth embodiment with reference to FIGS. 17 and 18. FIG. 17 is a diagram schematically showing a configuration of a system including a wireless control terminal and devices having a wireless function with which the wireless control terminal communicates, according to the fourth embodiment of the present invention. FIG. 18 is a diagram showing a sequence in which an image taken by a wireless image-taking terminal 1702 is stored in a wireless storage terminal 1703 in the system of FIG. 17.

As shown in FIG. 17, the system of this embodiment includes a wireless control terminal 1701, a wireless image-taking terminal 1702, and a wireless storage terminal 1703. The devices each have a wireless communication function of a shared system. In this embodiment, the Bluetooth is used as the wireless system in the same manner as in the third embodiment.

The wireless control terminal 1701 and the wireless image-taking terminal 1702 can be connected to each other via the BIP of the Bluetooth, and the wireless control terminal 1701 can perform operation control of the wireless image-taking terminal 1702, obtention of an image therefrom, or the like. The wireless storage terminal 1703, which is also compatible with the BIP, is connected to the wireless image-taking terminal 1702, so that the storing of image data transferred from the wireless image-taking terminal 1702 can be performed.

Here, a situation is assumed in which the memory of the wireless image-taking terminal 1702 becomes full during the photography with the wireless image-taking terminal 1702 being remotely controlled by the wireless control terminal 1701, and the image data taken by the wireless image-taking terminal 1702 is transferred to the wireless storage terminal 1703. With regard to operations for this situation, description will be made of an operation mode according to this embodiment in contrast to the conventional operation mode.

In the case of the conventional operation mode, the wireless control terminal 1701 first becomes a master to establish a wireless link with the wireless image-taking terminal 1702 via the BIP, and performs remote control of the photography operation. After that, the memory of the wireless image-taking terminal 1702 becomes full, and an alarm is issued to indicate to that effect from the wireless image-taking terminal 1702. Then, the user switches from the wireless control terminal 1701 back to the wireless image-taking terminal 1702 for operations, establishes a wireless link between the wireless image-taking terminal 1702 and the wireless storage terminal 1703, and transfers the photographic image file from the wireless image-taking terminal 1702 to the wireless storage terminal 1703. The above-mentioned procedure is troublesome.

In contrast, in the case of the operation mode according to this embodiment, a request for connection is first issued from the wireless control terminal 1701 to the wireless image-taking terminal 1702 (1801). Then, a wireless link is established between the wireless control terminal 1701 and the wireless image-taking terminal 1702 according to a defined procedure (1802). The detailed procedure for the wireless link establishment is standardized strictly, so that its description will be omitted here.

On the other hand, the wireless control terminal 1701 also sends out a request for connection to the wireless storage terminal 1703 (1803), and obtains information necessary for the connection with the wireless storage terminal 1703 (1804). Note that similarly to the third embodiment, in the Bluetooth communications, the information necessary for the actual connection with a counterpart can be collected without establishing the wireless link between terminals. Accordingly, the procedure is not necessarily executed for establishing the wireless link between the wireless control terminal 1701 and the wireless storage terminal 1703, thereby omitting its drawings. Further, a negotiation processing between the wireless control terminal 1701 and the wireless storage terminal 1703 may be performed before the connection processing with the wireless image-taking terminal 1702.

Next, the user uses the wireless control terminal 1701 to remotely control the wireless image-taking terminal 1702 to take an image (1805). When the memory of the wireless image-taking terminal 1702 becomes full during the image-taking, an alarm is issued to indicate to that effect from the wireless image-taking terminal 1702 to the wireless control terminal 1701 (1806). In response thereto, the wireless control terminal 1701 sends out to the wireless image-taking terminal 1702 an instruction to establish a new wireless link with the wireless storage terminal 1703 (1807), and also sends out the information necessary for the connection which is obtained from the wireless storage terminal 1703 along with the instruction to transfer data (1808). An operation trigger for the actual instruction to establish the new wireless link may be simply realized by a button click made on a user interface of the wireless control terminal 1701 or the like.

The wireless image-taking terminal 1702 establishes the wireless link with the wireless storage terminal 1703 based on the information obtained from the wireless control terminal 1701, so that the wireless link can instantaneously be established with respect to the wireless storage terminal 1703 without performing the negotiation processing (1809). After the wireless link with the wireless storage terminal 1703 is established, the wireless image-taking terminal 1702 transfers image data to the wireless storage terminal 1703 in response to an instruction from the wireless control terminal 1701 (1810). The wireless storage terminal 1703 stores the transferred image data.

As described above, according to this embodiment, the wireless control terminal 1701 also uses the connection information obtained from the wireless storage terminal 1703 to establish the wireless link between the wireless image-taking terminal 1702 and the wireless storage terminal 1703. Accordingly, it is possible to realize a wireless connection service that is constantly optimum without performing troublesome operations even if the form of the wireless connection service becomes complicated.

Fifth Embodiment

Figure 19:
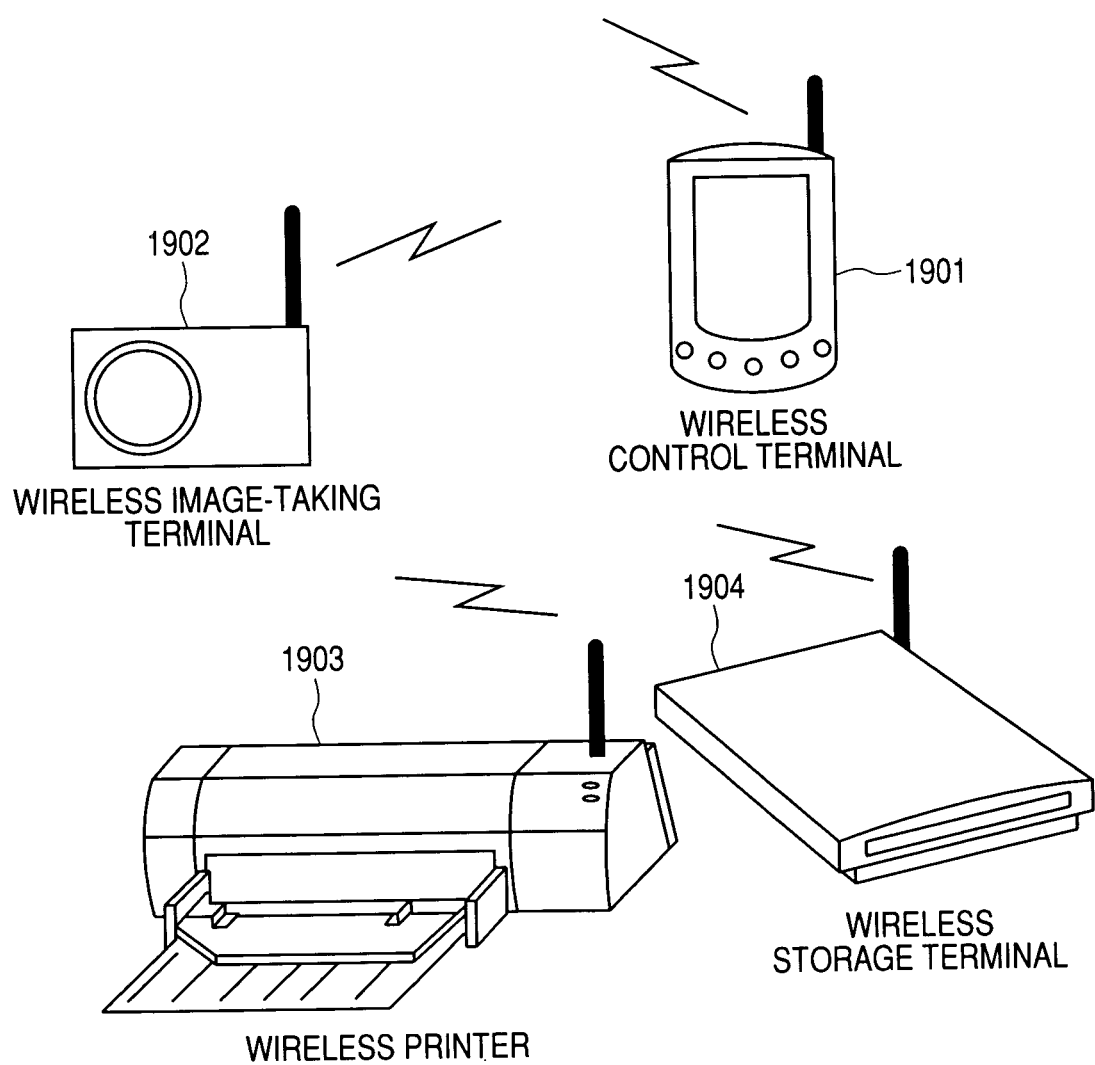
FIG. 19 is a diagram schematically showing a configuration of a system including a wireless control terminal and devices having a wireless function with which the wireless control terminal communicates, according to a fifth embodiment of the present invention.
Figure 20:
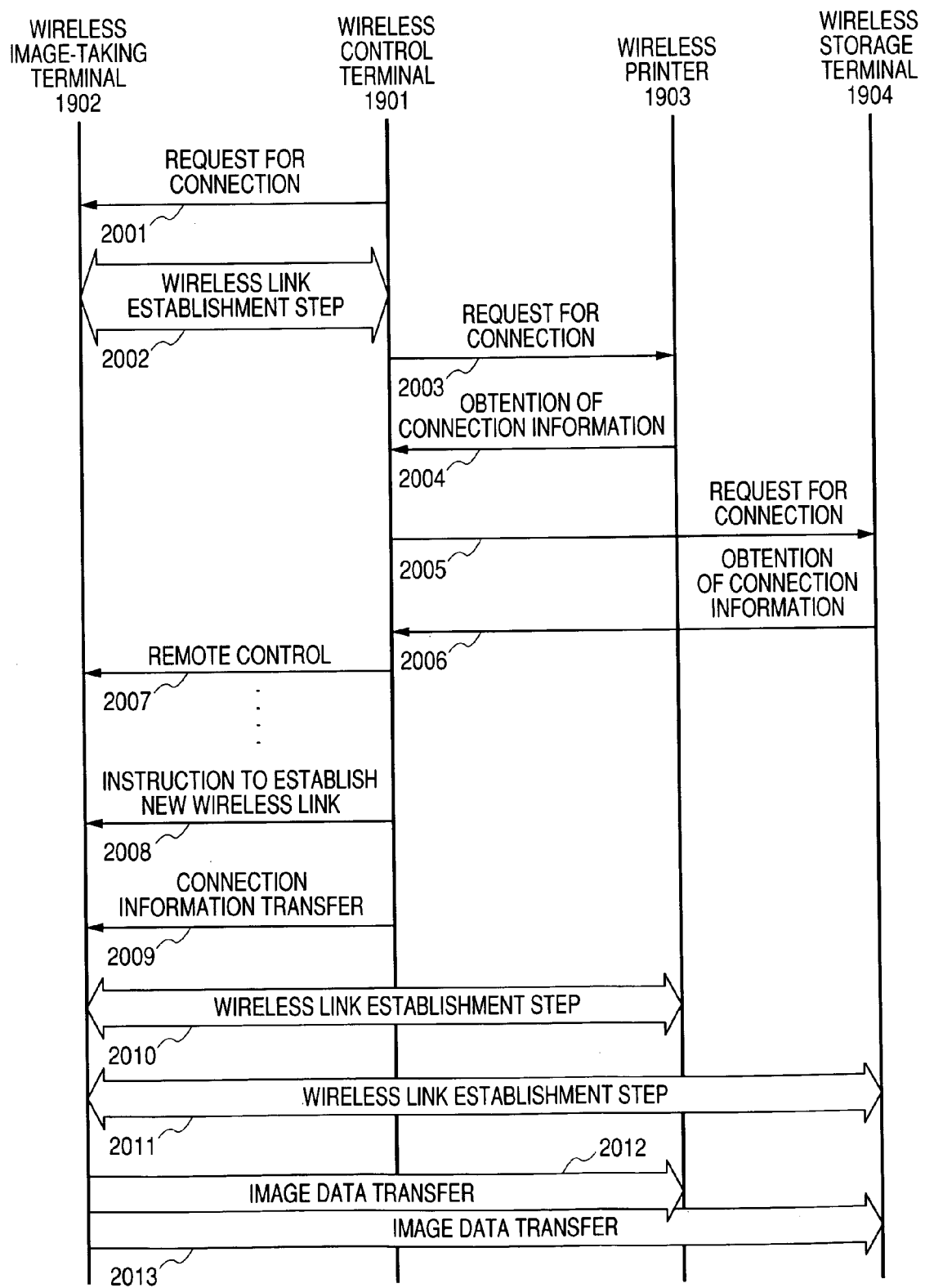
FIG. 20 is a diagram showing a sequence in which an image taken by a wireless image-taking terminal is printed by a wireless printer while being stored in a wireless storage terminal according to the fifth embodiment of the present invention.

Next, description will be made of a fifth embodiment with reference to FIGS. 19 and 20. FIG. 19 is a diagram schematically showing a configuration of a system including a wireless control terminal and devices having a wireless function with which the wireless control terminal communicates, according to the fifth embodiment of the present invention. FIG. 20 is a diagram showing a sequence in which an image taken by a wireless image-taking terminal 1902 is stored in a wireless storage terminal 1904 while being printed by the wireless printer 1903 in the system of FIG. 19.

As shown in FIG. 19, the system of this embodiment includes a wireless control terminal 1901, a wireless image-taking terminal 1902, a wireless printer 1903, and a wireless storage terminal 1904. The devices each have a wireless communication function of a shared system, which adopts the Bluetooth in the same manner as in the third embodiment.

The wireless control terminal 1901 and the wireless image-taking terminal 1902 can be connected to each other via the BIP of the Bluetooth, and the wireless control terminal 1901 can perform operation control of the wireless image-taking terminal 1902, obtention of an image therefrom, or the like. The wireless printer 1903, which is also compatible with the BIP, is connected to the wireless image-taking terminal 1902, so that the direct printing of a photographic image can be performed without using a PC or the like. The wireless storage terminal 1904, which is also compatible with the BIP, is connected to the wireless image-taking terminal 1902, so that the storing of the photographic image can be performed.

Here, a situation is assumed in which while the wireless control terminal 1901 remotely controls the wireless image-taking terminal 1902 to perform the photography, an arbitrary image taken by the wireless image-taking terminal 1902 is outputted to the wireless printer 1903, and at the same time, stored in the wireless storage terminal 1904. With regard to operations for this situation, description will be made of an operation mode according to this embodiment in contrast to the conventional operation mode.

In the case of the conventional operation mode, the wireless control terminal 1901 first becomes a master to establish a wireless link with the wireless image-taking terminal 1902 via the BIP, and performs remote control of the photography operation. After that, when the need for printing and storing image data arises, desired image data stored in the wireless image-taking terminal 1902 is temporarily transferred to the wireless control terminal 1901. Then, the wireless control terminal 1901 newly establishes a wireless link with the wireless printer 1903 and the wireless storage terminal 1904, outputs the image file to the wireless printer 1903, and transfers the image file to the wireless storage terminal 1904. This procedure is troublesome, and the transfer of the image data to the wireless control terminal 1901 is only a temporary processing, thereby imposing a useless transfer procedure.

In contrast, in the case of the operation mode according to this embodiment, as shown in FIG. 20, a request for connection is first issued from the wireless control terminal 1901 to the wireless image-taking terminal 1902 (2001). Then, a wireless link is established between the wireless control terminal 1901 and the wireless image-taking terminal 1902 according to a defined procedure (2002). The detailed procedure for the wireless link establishment is standardized strictly, so that its description will be omitted here.

On the other hand, the wireless control terminal 1901 also sends out a request for connection to the wireless printer 1903 (2003), and obtains from the wireless printer 1903 information necessary for the connection with the wireless printer 1903 (2004). Further, the wireless control terminal 1901 sends out a request for connection to the wireless storage terminal 1904 (2005), and obtains from the wireless storage terminal 1904 information necessary for the connection with the wireless storage terminal 1904 (2006). Note that similarly to the third embodiment and the fourth embodiment, in the Bluetooth communications, the information necessary for the actual connection with a counterpart can be collected without establishing the wireless link between terminals. Accordingly, the procedure is not necessarily executed for establishing the wireless link between the wireless control terminal 1901 and the wireless printer 1903 or between the wireless control terminal 1901 and the wireless storage terminal 1904, thereby omitting its drawings. Further, a negotiation processing with respect to the wireless printer 1903 and the wireless storage terminal 1904 may be performed before the connection processing with the wireless image-taking terminal 1902.

In the case where the user uses the wireless control terminal 1901 to remotely control the wireless image-taking terminal 1902 to take an image, and the printing of the photographic image data and the storing thereof for backup become necessary during the photography (2007), the wireless control terminal 1901 sends out an instruction to establish a new wireless link with the wireless printer 1903 and the wireless storage terminal 1904 to the wireless image-taking terminal 1902 (2008). Then, the information necessary for the connection between the wireless printer 1903 and the wireless storage terminal 1904, which has already been obtained, is sent out to the wireless image-taking terminal 1902 along with a print instruction for image data and an instruction to transfer data (2009). An operation trigger for the actual instruction to establish the new wireless link may be simply realized by a button click made on a user interface of the wireless control terminal 1901 or the like.

The wireless image-taking terminal 1902 establishes the wireless link with the wireless printer 1903 and the wireless storage terminal 1904 based on the information obtained from the wireless control terminal 1901, so that the wireless link can instantaneously be established with respect to the wireless printer 1903 and the wireless storage terminal 1904 without performing the negotiation processing (2010 and 2011). Then, the wireless image-taking terminal 1902 transfers image data to the wireless printer 1903 and the wireless storage terminal 1904 in response to instructions from the wireless control terminal 1901 (2012 and 2013). The wireless printer 1903 performs printing of the transferred image data, and the wireless storage terminal 1904 performs the storing of the transferred image data. Here, if possible in terms of the standard of wireless communications, the image data may simultaneously be sent to the wireless printer 1903 and the wireless storage terminal 1904. The case leads to the reduction in time for transferring the image data compared to the case of sending the image data to the wireless printer 1903 and the wireless storage terminal 1904 individually.

As described above, according to this embodiment, the wireless control terminal 1901 also uses the connection information obtained from the wireless printer 1903 and the wireless storage terminal 1904 to establish the wireless links between the wireless image-taking terminal 1902 and the wireless printer 1903 and between the wireless image-taking terminal 1902 and the wireless storage terminal 1904. Accordingly, it is possible to realize a wireless connection service that is constantly optimum without performing troublesome operations even if the form of the wireless connection service becomes complicated.

This application claims priority from Japanese Patent Applications No. 2003-390404 filed Nov. 20, 2003 and No. 2003-416998 filed Dec. 15, 2003, which are hereby incorporated by reference herein.

What is claimed is:

1. A control apparatus that remotely controls an information processing apparatus having a photography function, comprising:
    a retrieving device for retrieving information of connection to another information processing apparatus, different from both the control apparatus and the information processing apparatus, from the other information processing apparatus;
    a receiving device for receiving from the information processing apparatus a notification that a storage amount of a memory of the information processing apparatus reaches a predetermined value by remotely imaging an instruction from the control apparatus, during remotely imaging by an instruction from the control apparatus;
    a transfer device for transferring the connection information retrieved by the retrieving device to the information processing apparatus, in response to a reception of the notification by the receiving device; and
    an instruction device for, in the case of receiving the notification, instructing the information processing apparatus to directly transfer the data stored in the memory to the other information processing apparatus based on the connection information when transferring the connection information by the transfer device.

2. The control apparatus according to claim 1, wherein the information processing apparatus comprises:
    a photographic device for performing photography in response to an instruction from the control apparatus;
    a checking device for checking a free capacity of the memory after an image taken by the photographic device is stored in a memory; and
    a notifying device for notifying the control apparatus of whether the photography is possible or not based on a result of checking by a checking device.

3. The control apparatus according to claim 1, further comprising:
    a receiving device for receiving information of the data stored in the information processing apparatus; and a selecting device for selecting data to be transferred by the information processing apparatus based on the information received by the receiving device.

4. The control apparatus according to claim 1, further comprising a display device for displaying the connection information to be transferred to the information processing apparatus, based on information received from the information processing apparatus.

5. A communication apparatus comprising:
a photographic device for performing photography in response to an instruction from a control apparatus;
a notifying device for notifying, in a case where a storage amount of a memory of the communication apparatus reaches a predetermined value by the photography in the middle of the photography performed in response to the instruction from the control apparatus, the control apparatus that the storage amount of the memory of the communication apparatus reaches the predetermined value;
a receiving device for receiving, from the control apparatus which responded to the notification by the notifying device, connection information for connecting with another communication apparatus which is different from both the control apparatus and the communication apparatus; and
a transfer device for, based on the connection information received by the receiving device, directly connecting with the another communication apparatus and directly transferring data in the memory to the another communication apparatus.

6. The communication apparatus according to claim 5, further comprising a deleting device for deleting the data transferred by the transfer device, from the memory.

7. The communication apparatus according to claim 5, further comprising:
a checking device for checking a free capacity of the memory after an image taken by the photographic device is stored in the memory; and
a notifying device for notifying the control apparatus of whether the photography is possible or not based on a result of checking by the checking device.

8. The communication apparatus according to claim 5, wherein the transfer device transfers all image data stored in the memory.

9. A control method for a control apparatus that remotely controls an information processing apparatus having a photography function, comprising the steps of:

retrieving information of connection to another information processing apparatus, different from both the control apparatus and the information processing apparatus, from the other information processing apparatus;
receiving from the information processing apparatus a notification that a storage amount of a memory of the information processing apparatus reaches a predetermined value by remotely imaging by an instruction from the control apparatus, during remotely imaging by an instruction from the control apparatus;
transferring the connection information retrieved in the retrieving step to the information processing apparatus, in response to a reception of the notification in the receiving step; and
in the case of receiving the notification instructing the information processing apparatus to directly transfer the data stored in the memory to the other information processing apparatus based on the connection information when transferring the connection information in the transfer step.

10. A communication method comprising the steps of:
performing photography in response to an instruction from a control apparatus;
notifying, in a case where a storage amount of a memory of a communication apparatus reaches a predetermined value by the photography in the middle of the photography performed in response to the instruction from the control apparatus, the control apparatus that the storage amount of the memory of the communication apparatus reaches the predetermined value;
receiving, from the control apparatus which responded to the notification in the notifying step, connection information for connecting with another communication apparatus which is different from both the control apparatus and the communication apparatus; and
based on the connection information received in the receiving step, directly connecting with the another communication apparatus and directly transferring data in the memory to the another communication apparatus.

11. A non-transitory computer-readable storage medium that stores a program for causing a computer to execute a control method according to claim 9.

12. A non-transitory computer-readable storage medium that stores a program for causing a computer to execute a control method according to claim 10.

* * * * *